United States Patent [19]

Honma et al.

[11] Patent Number: 5,774,634
[45] Date of Patent: Jun. 30, 1998

[54] IMAGE PROCESSING METHOD AND APPARATUS

[75] Inventors: Koichi Honma, Kawasaki; Hisashi Ishikawa, Saitama-ken; Hiroshi Atobe, Yokohama, all of Japan

[73] Assignee: Canon Kabushiki Kaisha, Tokyo, Japan

[21] Appl. No.: 310,808

[22] Filed: Sep. 22, 1994

Related U.S. Application Data

[63] Continuation of Ser. No. 736,740, Jul. 26, 1991, abandoned.

[30] Foreign Application Priority Data

| Jul. 31, 1990 | [JP] | Japan | 2-201104 |
| Jul. 31, 1990 | [JP] | Japan | 2-204793 |
| Jul. 31, 1990 | [JP] | Japan | 2-204797 |
| Jul. 31, 1990 | [JP] | Japan | 2-204798 |
| Oct. 22, 1990 | [JP] | Japan | 2-281955 |

[51] Int. Cl.$^6$ ............................................. H04N 1/41
[52] U.S. Cl. ......................... 395/109; 358/426; 358/444; 358/462
[58] Field of Search .................... 358/444, 404, 358/448, 462, 464, 426, 261.1; 395/109, 114, 115; H04N 1/41

[56] References Cited

U.S. PATENT DOCUMENTS

| 4,568,983 | 2/1986 | Bobick | 385/261.1 |
| 4,587,633 | 5/1986 | Wang et al. | 358/448 |
| 4,694,352 | 9/1987 | Ina et al. | 358/426 |
| 4,797,945 | 1/1989 | Suzuki et al. | 382/56 |
| 4,800,431 | 1/1989 | Deering | 358/404 |
| 4,887,151 | 12/1989 | Wataya | 358/80 |
| 4,959,868 | 9/1990 | Tanioka | 358/469 |
| 4,974,071 | 11/1990 | Maeda | 358/80 |
| 5,003,494 | 3/1991 | Ng | 358/80 |
| 5,023,919 | 6/1991 | Wataya | 382/54 |
| 5,072,291 | 12/1991 | Sekizawa | 358/462 |
| 5,072,303 | 12/1991 | Silverberg | 358/442 |
| 5,075,779 | 12/1991 | Lefebvre et al. | 358/456 |
| 5,089,884 | 2/1992 | Suzuki et al. | 358/80 |
| 5,095,512 | 3/1992 | Roberts et al. | 358/261.1 |
| 5,107,331 | 4/1992 | Collell et al. | 358/456 |
| 5,131,058 | 7/1992 | Ting et al. | 358/75 |
| 5,134,493 | 7/1992 | Laman et al. | 358/75 |
| 5,140,350 | 8/1992 | Itoh | 358/448 |
| 5,168,292 | 12/1992 | Kadowaki et al. | 358/78 |
| 5,576,757 | 11/1996 | Roberts et al. | 348/207 |

FOREIGN PATENT DOCUMENTS

| 429283 | 5/1989 | European Pat. Off. | G06F 15/64 |
| 62-178071 | 8/1987 | Japan . | |
| 2102240 | 1/1983 | United Kingdom | H04N 1/28 |

OTHER PUBLICATIONS

Patent Abstracts of Japan, vol.12, No. 314 (kokai 63–078672) 4/88.

Chen et al., "A Binary Representation of Mixed Documents (Text/Graphic/Image) That Compresses", ICASSP Proceedings, vol. 1, pp. 537–540 (1986).

Yasuda, "Internationalized Encoding of Color Still Image" (in Japanese), at pp. 398–409 of No. 6, vol. 18 of Image Electronic Society (1989).

Primary Examiner—Thomas L. Stoll
Attorney, Agent, or Firm—Fitzpatrick, Cella, Harper & Scinto

[57] ABSTRACT

An image processing apparatus and method in which plural gradation-information storage units are provided, and at least one of those units is selected to store a given body of gradation informatin based on command information, such as resolution information. The different units store gradation information in different forms, e.g., compressed and uncompressed.

14 Claims, 25 Drawing Sheets

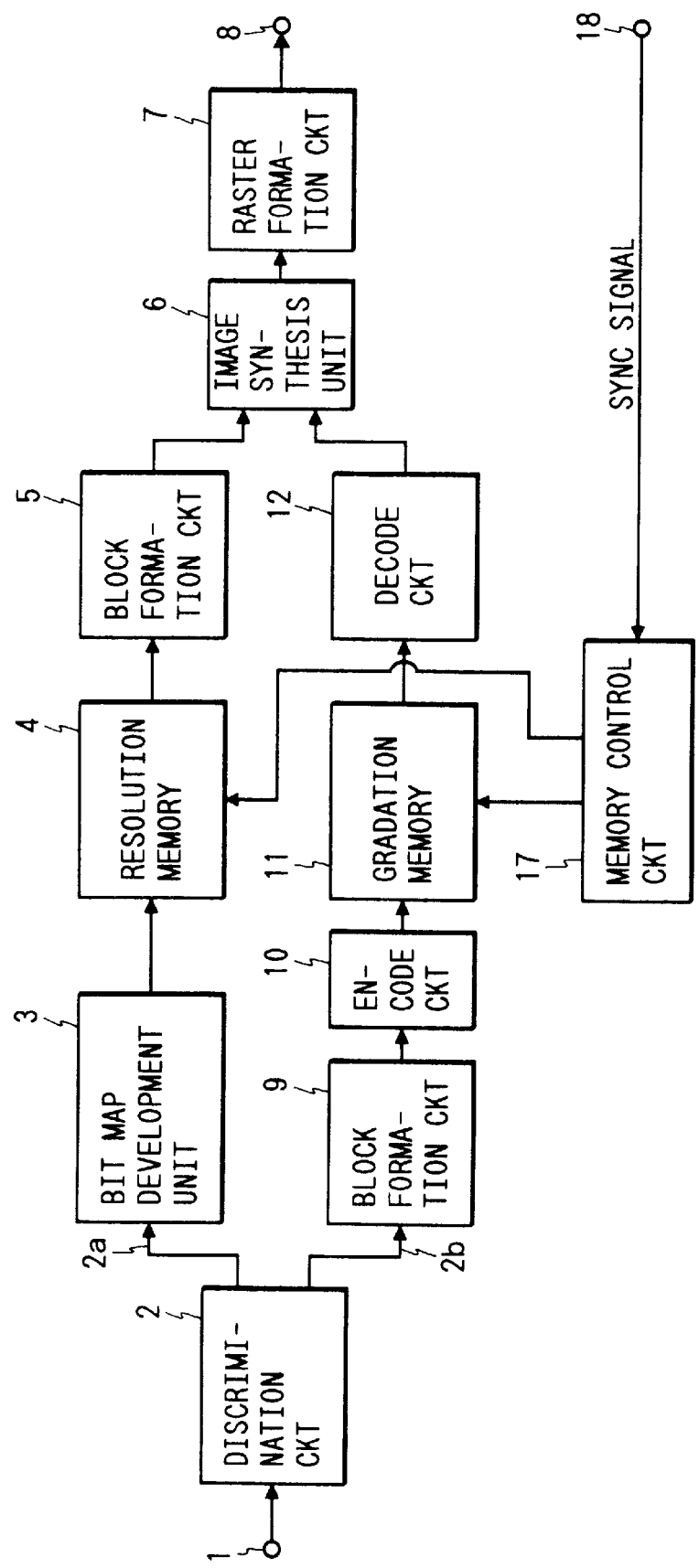

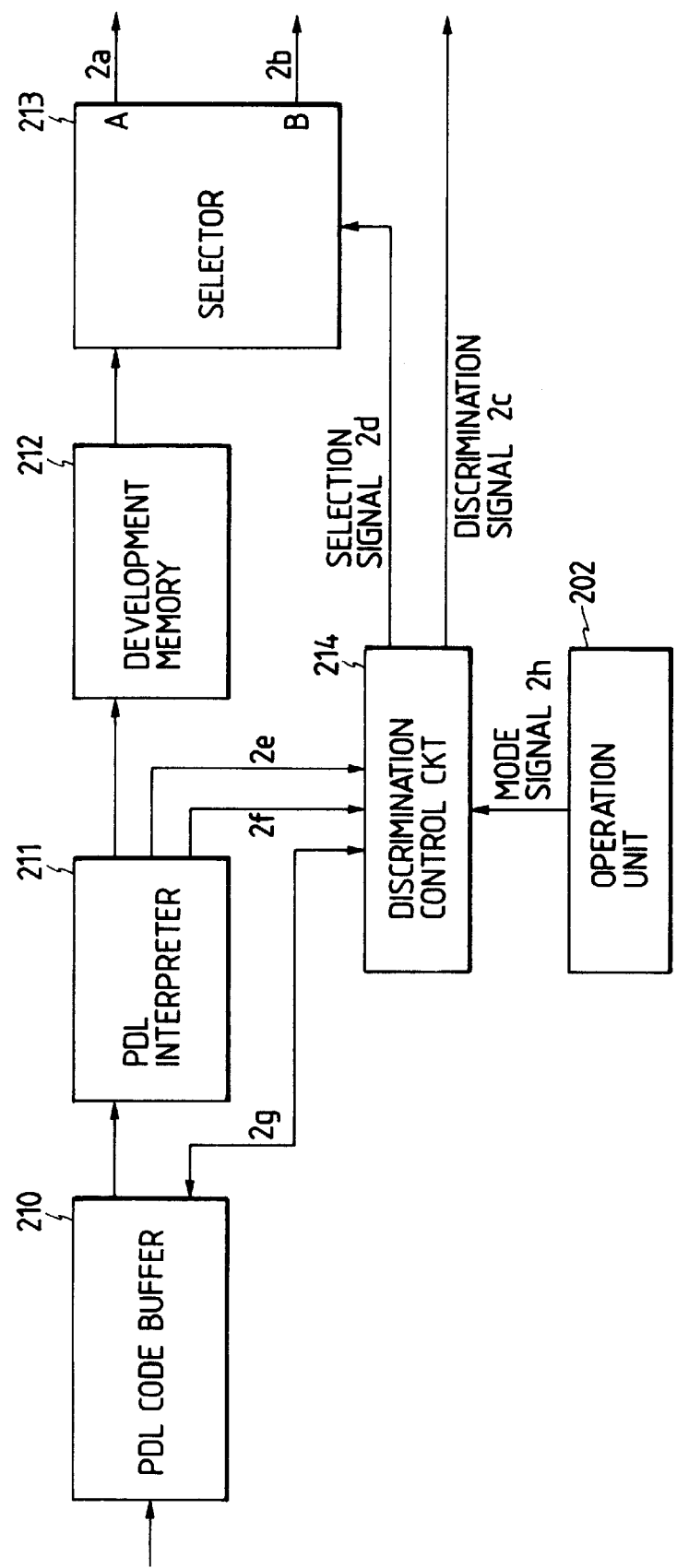

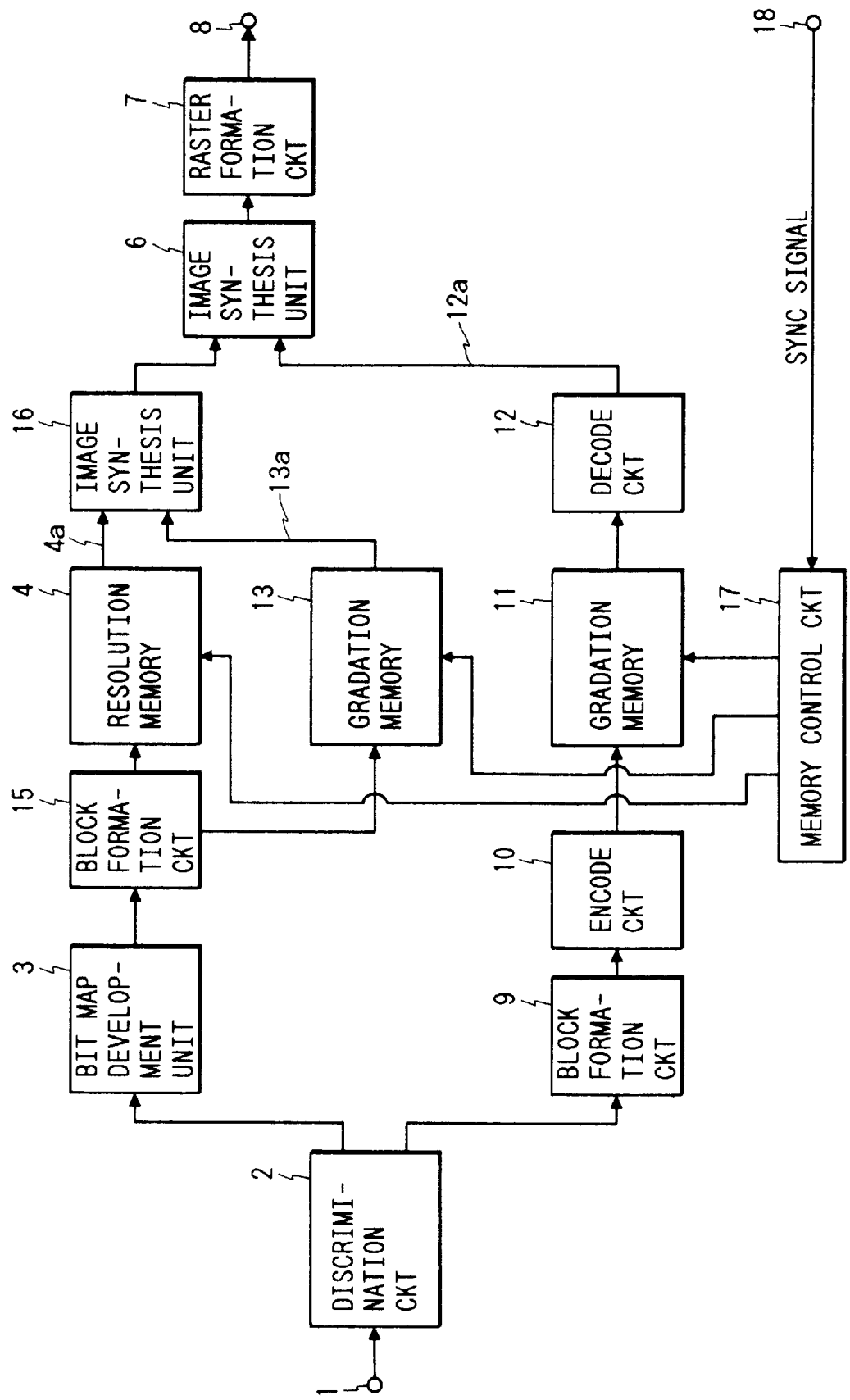

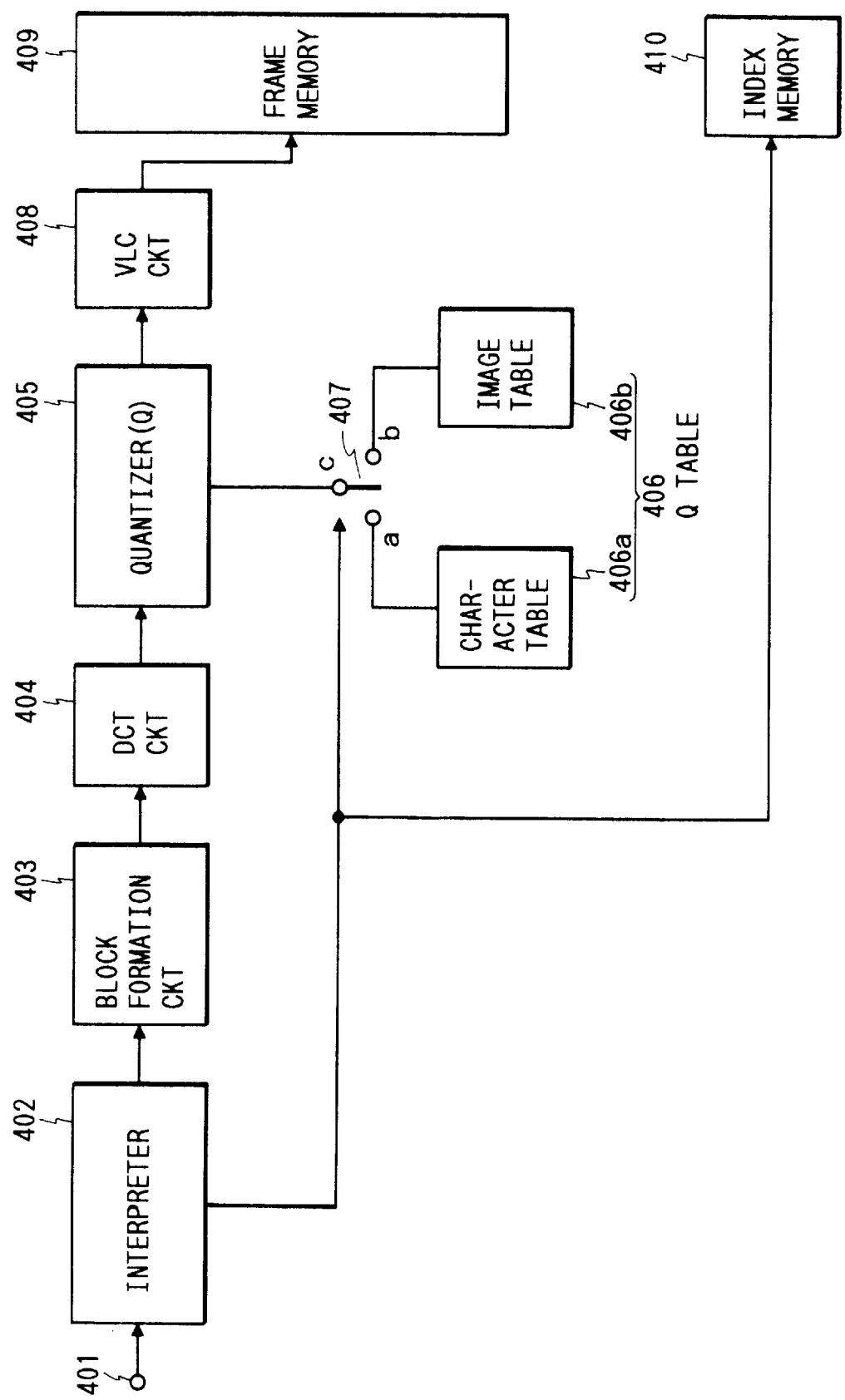

FIG. 23A

| | | | | | | | |
|---|---|---|---|---|---|---|---|
| 10 | 10 | 20 | 40 | 60 | 80 | 100 | 100 |
| 10 | 10 | 20 | 40 | 60 | 80 | 100 | 100 |
| 20 | 20 | 40 | 60 | 80 | 100 | 100 | 100 |
| 40 | 40 | 60 | 80 | 100 | 100 | 100 | 100 |
| 60 | 60 | 80 | 100 | 100 | 100 | 100 | 100 |
| 80 | 80 | 100 | 100 | 100 | 100 | 100 | 100 |
| 100 | 100 | 100 | 100 | 100 | 100 | 100 | 100 |
| 100 | 100 | 100 | 100 | 100 | 100 | 100 | 100 |

IMAGE TABLE

FIG. 23B

| | | | | | | | |
|---|---|---|---|---|---|---|---|
| 20 | 20 | 30 | 30 | 30 | 40 | 40 | 40 |
| 20 | 20 | 30 | 30 | 40 | 40 | 40 | 40 |
| 30 | 30 | 30 | 40 | 40 | 40 | 40 | 40 |
| 30 | 30 | 40 | 40 | 40 | 40 | 40 | 40 |
| 30 | 40 | 40 | 40 | 40 | 40 | 40 | 40 |
| 40 | 40 | 40 | 40 | 40 | 40 | 40 | 40 |
| 40 | 40 | 40 | 40 | 40 | 40 | 40 | 40 |
| 40 | 40 | 40 | 40 | 40 | 40 | 40 | 40 |

CHARACTER TABLE

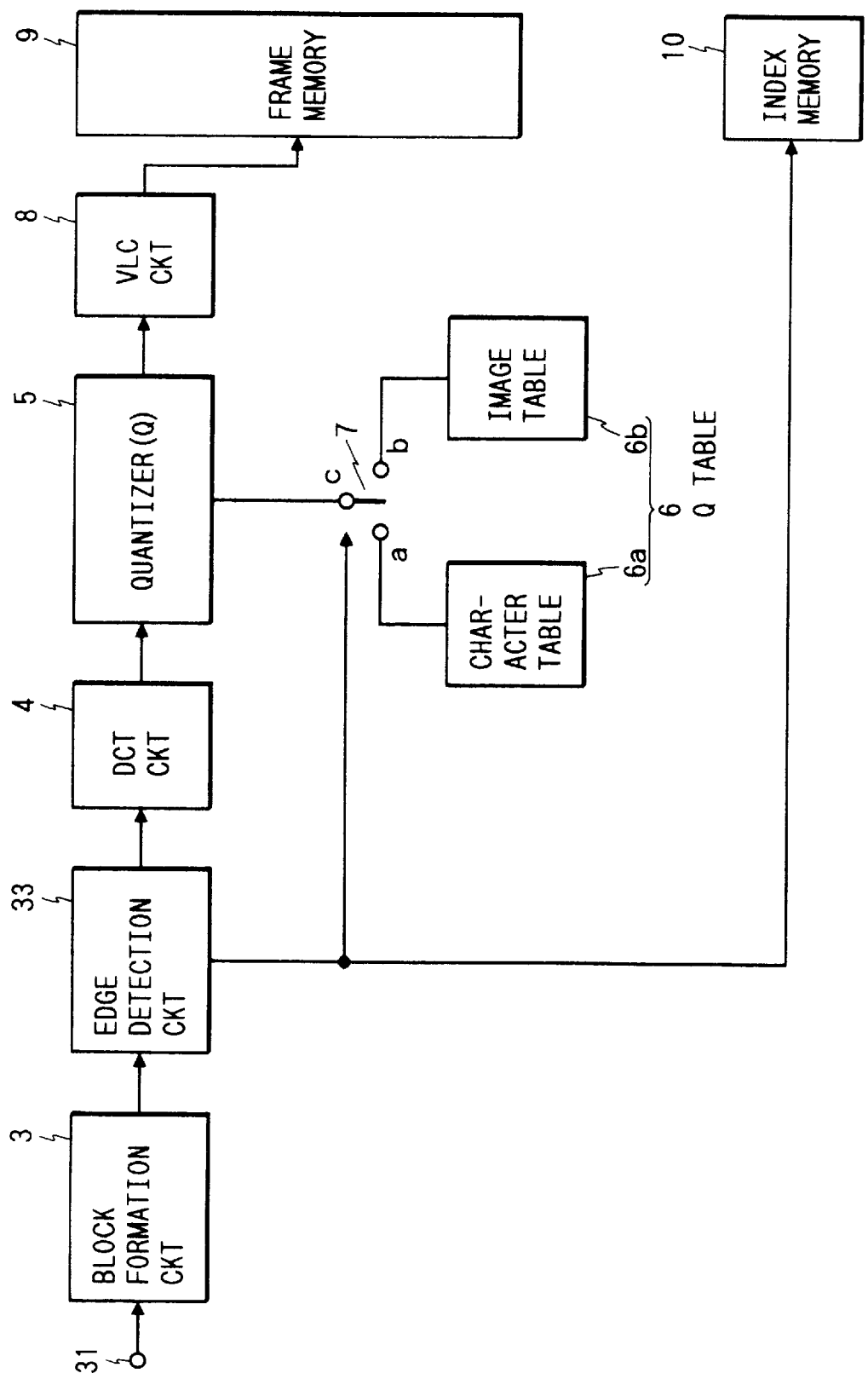

IMAGE PROCESSING METHOD AND APPARATUS

This application is a continuation-in-part of application Ser. No. 07/736,740 filed Jul. 26, 1991, now abandoned.

BACKGROUND OF THE INVENTION

1. Field of the Invention

The present invention relates to an image processing apparatus, and, more particularly, to an image processing apparatus having a means capable of storing image information of a mixture of half-tone images, photographs possessing gradation (color included), characters possessing high resolution and line pictures.

2. Related Background Art

The storage capacity of the memory to store a half-tone image such as a photograph in the memory is (number of pixels)×(number of gradation bits)×(number of colors). In particular, a great storage capacity is necessary to store a high grade color image. Therefore, a variety of methods of compressing the quantity of information have been disclosed in order to reduce the required quantity of the memory before it is stored in the memory.

FIG. 5 is a block diagram which illustrates an ordinary method of storing a compressed image. An image described in PDL (Page Description Language), for example, PS (Postscript) suggested by Adobe, CaPSL suggested by Canon or the like, is received through an input terminal 1. The received PDL image is then supplied to a discrimination circuit 2 from which characters and line pictures described in accordance with the line picture code are transmitted to a branch line 2a before it is developed to bit map information for each pixel by a bit map development unit 3.

On the other hand, image data in which pixels having gradation are arranged such as a photograph, is transmitted to a branch line 2b. The bit map information such as characters, line pictures and the like and image data are synthesized in an image synthesis circuit 13 while being synchronized with each other. Then, the synthesized data is sectioned into blocks by a block formation circuit 9 before they are encoded by an encoding circuit 10. Then, the encoded data is stored as a compressed image in an image memory 14. The image stored in the image memory 14 is decoded by a decoding circuit 12 while being synchronized with an output device synchronous signal (omitted from illustration). Then, it is rastered by a raster formation circuit 7 before it is, through an output terminal 8, transmitted to an output device (omitted from illustration), for example, a page printer of an electronic photographic system. The above-described process of compressing the image by means of the block formation and the decoding process may employ, for example, a baseline system disclosed by JPEG (Joint Photographic Experts Group) as the international standard method of encoding a color still image.

However, a problem of deterioration in the quality of the line picture arises in the above-described conventional structure because the line picture which must possess a high resolution is also compressed similarly to an image having gradation (color). That is, characters and line pictures must be stored while priority is given to the resolution. On the other hand, photographs and graphs must be stored while priority is given to the gradation.

In general, texts must be stored while maintaining high resolution in order to maintain the smoothness and continuity of diagonal lines. On the contrary, images are stored while maintaining an excellent gradation in order to prevent the deterioration in the image quality due to the generation of a false profile. Therefore, the storage apparatus for storing an image of a mixture of image areas and text areas has been provided with a number of pixels, with which satisfactory resolution can be obtained to enable the grade of the text, that is, the smoothness and continuity of diagonal lines to be maintained. Furthermore, the storage apparatus has been arranged in such a manner that it possesses such number of gradations as to prevent deterioration in the image quality due to the image false contour.

However, a storage apparatus of the type described above has encountered a problem in that the size and the cost of the apparatus (hardware) cannot be reduced as desired because a great memory capacity is required with the increase in both of the number of pixels and the gradations for the purpose of improving the quality of each of the text and the image. In particular, when a full color image is stored, there arises a necessity of providing three planes for red (R), green (G) and blue (B). Therefore, the required memory capacity is enlarged by three times. Assuming that the number of gradations for each of R, G and B planes is 256, the number of bits for each pixel, which is necessary to display the full color image, is 24. As a result, there arises a necessity of a large memory capacity which is 24 times the capacity required to display a monotone character (the number of bits for each pixel is 1).

The storage capacity required to store a half-tone image (hereinafter, called an "image") such as a photograph in a memory is (number of pixels)×(number of gradation bits)×(number of colors). In particular, a great storage capacity is necessary to store a high grade color image. Therefore, a variety of methods of compressing the quantity of information have been disclosed in order to reduce the required quantity of the memory by compressing the quantity of information before it is stored in the memory.

FIG. 25 is a block diagram which illustrates an encoding method ("Internationalized Encoding of Color Still Image", disclosed by Yasuda, pp. 398–409, No. 6, Vol. 18, 1989, published by the Image Electronics Society) of the Baseline System suggested by JPEG (Joint Photographic Experts Group) as the international standard method of 10 encoding a color still image.

Image pixel data received through an input terminal 401 is sectioned into blocks each of which is composed of 8×8 pixels by a block formation circuit 403. Then, the block is subjected to a cosine transformation in a discrete cosine transformation (DCT) circuit 417 before the transformation coefficient is supplied to a quantizer (Q) 440. The quantizer 440 linear-quantizes the transformation coefficient in accordance with quantization step information supplied from a quantizer table 441. A DC coefficient among the quantized transformation coefficients is, by a predictive encoding circuit (DPCM) 442, subjected to a subtraction process in which the difference (estimated error) from the DC component in the previous block is calculated. The difference thus obtained is then supplied to a Huffman encoding circuit 443.

FIG. 26 is a block diagram which illustrates the detailed structure of the predictive encoding circuit 442 shown in FIG. 25.

The DC coefficient quantized by the quantizer 440 is supplied to a delay circuit 453 and a subtracter 454. The delay circuit 453 is a circuit in which the discrete cosine transformation circuit is delayed by one block, that is, by the time necessary to calculate data for 8×8 pixels. Therefore, the DC coefficient of the previous block is supplied from the delay circuit 453 to the subtracter 454. As a result, the subtracter 454 transmits the difference (predictive error) in the DC coefficient from the previous block (since the predictive encoding circuit 442 according to this embodiment uses the value of the previous block as the predictive value, the predictive encoding circuit 442 is composed of the delay circuit 453 as described above).

A one-dimensional Huffman encoding circuit 443, shown in FIG. 25, variable-length-encodes a predictive error signal supplied from the predictive encoding circuit 442 in accordance with the DC Huffman code table 444 so as to supply it, as a Huffman code, to a multiplexer circuit 451 to be described later.

On the other hand, AC coefficients (coefficients except for the DC coefficient) quantized by the quantizer 440 are zigzag-scanned by a scan conversion circuit 445 in ascending order as shown in FIG. 27 so as to be supplied to a significant coefficient detection circuit 446. The significant coefficient detection circuit 446 judges whether or not the quantized AC coefficient is "0". If it is "0", the significant coefficient detection circuit 446 supplies a count-up signal to a run length counter 447 so that the value of the counter is increased by one. If the AC coefficient is not "0", a reset signal is supplied to the run length counter 447 so as to reset the value of the counter. Furthermore, the coefficient is, by a group formation circuit 448, sectioned into group number SSSS and an additional bit as shown in FIG. 28. The group number SSSS is supplied to the Huffman encoding circuit 449, while the additional bit is supplied to the multiplexer circuit 451.

The above-described run length counter 447 is a circuit for counting a run length of "0"'s and as well as supplying the number NNNN of "0"'s present between significant coefficients except for "0" to a secondary-dimensional Huffman encoding circuit 449. The Huffman encoding circuit 449 variable-length-encodes the supplied run length NNNN of "0"'s and the group number SSSS of the significant coefficient in accordance with an AC Huffman code table 450 so as to supply them to the multiplexer circuit 451.

The multiplexer circuit 451 multiplies the DC Huffman code for one block (input pixels 8×8), the AC Huffman code and the additional bit so as to transmit compressed image data through an output terminal 452.

As described above, compressed image data transmitted through the output terminal 452 is stored in the memory, while the compressed image data is expanded at the time of the reading operation. As a result, the memory capacity can be reduced.

However, the above-described conventional structure possesses only one quantizing table 441 in the quantizer unit 440 thereof. Therefore, it has been difficult to improve the reproducibility of both of the line picture such as the character graphs and the half-tone image such as the photograph. That is, the character (line picture) must improve the resolution, while the half-tone image must improve the gradation.

SUMMARY OF THE INVENTION

Accordingly, an object of the present invention is to provide an image processing apparatus capable of reproducing high quality image.

In order to achieve the above-described object, according to one aspect of the present invention, there is provided an image processing apparatus comprising: a plurality of gradation-information storage means for storing gradation information; resolution information storage means for storing resolution information, wherein the plurality of gradation information storage means are selectively used in accordance with the resolution information stored in the resolution information storage means.

Another object of the present invention is to reduce the quantity of data while preventing deterioration in the image quality.

In order to achieve the above-described object, according to another aspect of the present invention, there is provided an image processing method comprising the steps of: discriminating line image data and half-tone image data described in page description language; storing discriminated line image data in first memory means; compressing the discriminated half-tone image data; and storing the compressed half-tone image data in second memory means.

Another object of the present invention is to enable data to be compressed at high resolution while preventing deterioration in the image quality.

In order to achieve the above-described object, according to another aspect of the present invention, there is provided an image processing apparatus comprising: discriminating means for interpreting input command data so as to discriminate whether data to be processed in accordance with the command data represents a line image or a halftone image; converting means for converting the data to be processed in accordance with the command data into image data for each pixel; and compressing means for, in accordance with the discrimination result, compressing the image data which has been converted by the converting means.

Another object of the present invention is to provide an excellent encoding method.

Another object of the present invention is to reduce the required memory capacity of the apparatus.

Another object of the present invention is to simplify the structure of the circuit.

Another object of the present invention is to raise the processing speed.

Another object of the present invention is to make the parameter to be most suitable at the time of the quantizing process.

Other and further objects, features and advantages of the invention will be appear more fully from the following description.

BRIEF DESCRIPTION OF THE DRAWINGS

FIGS. 1A and 1B respectively are block diagrams which illustrate a first embodiment of an image processing apparatus according to the present invention;

FIGS. 2A to 2C respectively are block diagrams which illustrate a second embodiment of the image processing apparatus according to the present invention;

FIG. 3 is a block diagram which illustrates a third embodiment of the image processing apparatus according to the present invention;

FIG. 22 is a schematic block diagram which illustrates the structure of an eleventh embodiment of the image processing apparatus according to the present invention;

FIGS. 23A and 23B respectively illustrate the content of an image table and that of a character table;

FIG. 24 is a schematic block diagram which illustrates the structure of a twelfth embodiment of the image processing apparatus;

DESCRIPTION OF THE PREFERRED EMBODIMENTS

[Embodiment 1]

Figure 1B:
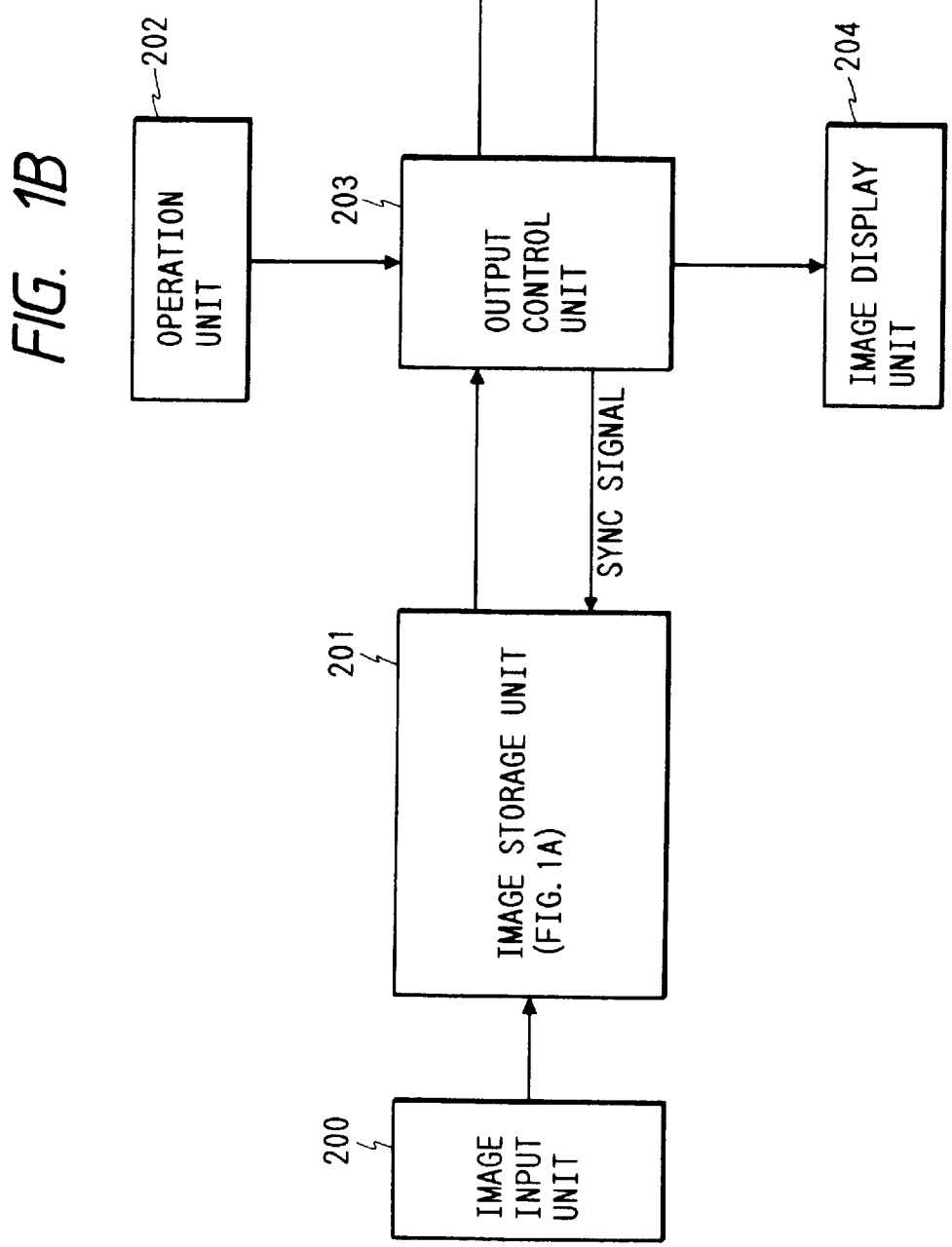

Preferred embodiments of the present invention will now be described with reference to the drawings.

FIG. 1A is a block diagram which illustrates an embodiment of an image processing apparatus according to the present invention. An image described in page describing language (PDL), for example, PS (Post Script) suggested by Adobe or CaPSL suggested by Canon, is supplied to an input terminal 1. The received PDL image is, by a discriminating circuit 2, transmitted in such a manner that line picture data such as characters and graphs described in the graphic code are transmitted to a branch line 2a before it is developed into bit map data (image data for each pixel) by a bit map development circuit 3. The bit map data is then developed into a binary signal formed into a bit map manner by the bit map development circuit 3 before it is stored into a resolution memory 4 as high resolution information.

On the other hand, image data possessing gradation information (color information included) written in the PDL is, by the discriminating circuit 2, selectively transmitted to a branch line 2b. It is sectioned into blocks each of which is composed of 8×8 pixels (one pixel has 256 gradations) by a block formation circuit 9 composed of a delay memory for 7 lines. The image data sectioned into the blocks is, by an encoding circuit 10 for encoding each block, encoded after it has been subjected to a compression process. Then, the encoded data is stored in a gradation memory 11.

The line picture data stored in the resolution memory 4 is sectioned into blocks each of which is composed of 8×8 pixels (one pixel has 1 gradation) by a block formation circuit 5. Image data stored in the gradation memory 11 is decoded by a decoding circuit 12 before the line picture data and the image data are synthesized by an image synthetic circuit 6 while synchronizing with each other by a memory control circuit 17 in accordance with a synchronous signal received through an input terminal 18 and transmitted from an output device, for example, a page printer. The synthesized image data is rastered by a raster circuit 7 before it is transmitted through an output terminal 8 to the output device.

FIG. 1B illustrates the overall structure of the image processing apparatus including the image storage unit shown in FIG. 1A.

Referring to FIG. 1B, reference numeral 200 represents an image input unit including a host computer, image data supplied from the image input unit 200 being supplied to the input terminal 1 of an image storage unit 201. Reference numeral 202 represents an operation unit through which an instruction of the portion to which the image data is transmitted is made by an operator. Reference numeral 203 represents an output control unit for controlling the portion to which the image data is transmitted and transmitting a memory reading synchronous signal. Reference numeral 204 represents an image display portion such as a display. Reference numeral 205 represents a transmission unit through which the image data is transmitted through a public line (digital lines includes) or a local area network. Reference numeral 206 represents an image transmitting portion such as a laser beam printer for forming a latent image by, for example, applying laser beams to a photosensitive member so as to convert the latent image into a visible image. The image transmitting portion 206 may be an ink jet printer, a thermal transferring printer, a dot printer or the like. As an alternative to this, the image transmitting portion 206 may be a bubble jet type printer which uses a head of a type for discharging a liquid droplet by generating film boiling by utilizing thermal energy.

[Embodiment 2]

Figure 2A:
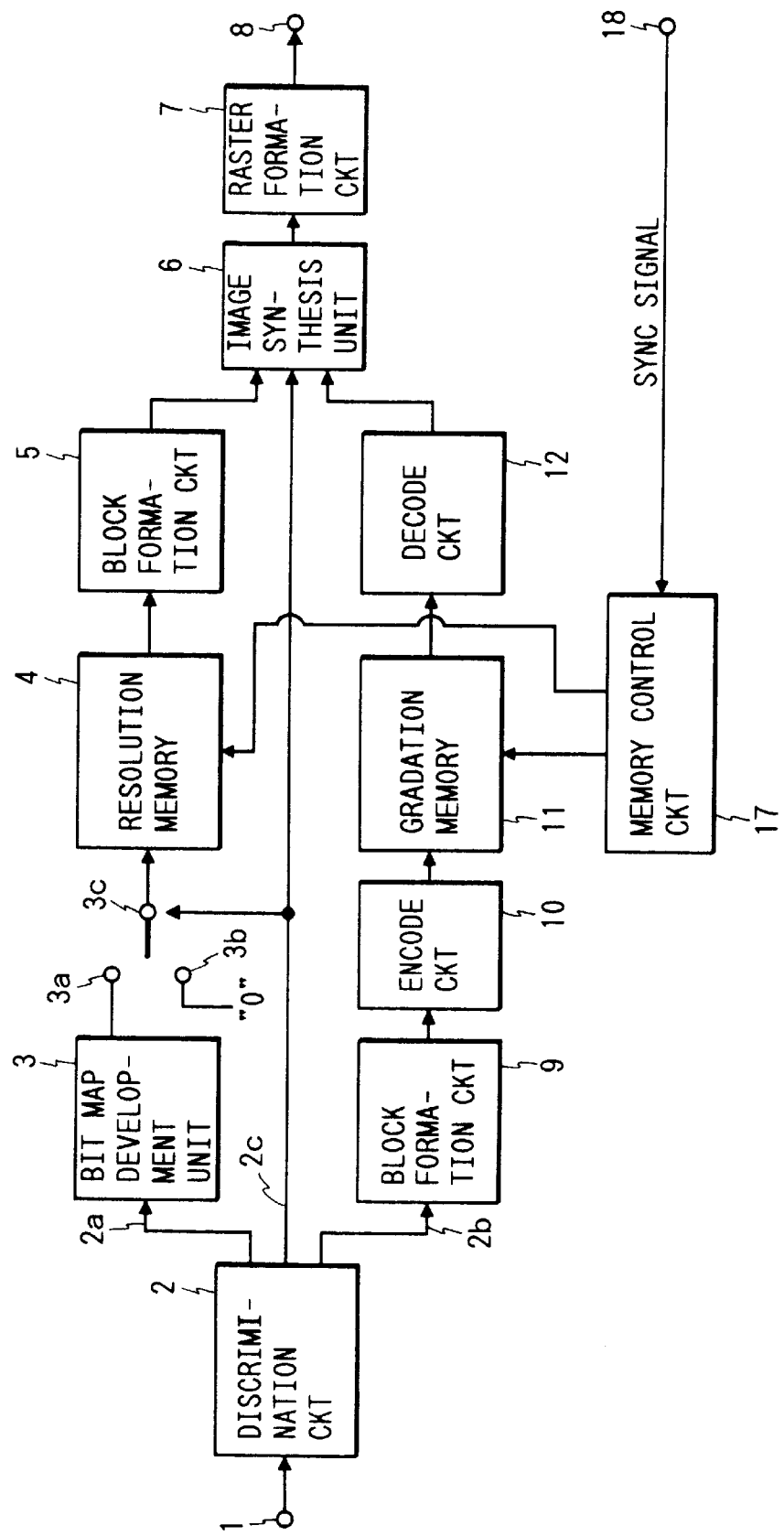

FIG. 2A is a block diagram which illustrates a second embodiment of the present invention, where the blocks having the same functions as those according to the embodiment shown in FIG. 1 are given the same reference numerals.

This embodiment is arranged in such a manner that a posterior function is additionally provided for the structure according to the first embodiment. The "posterior function" is a function performed in a case where an image which has been previously transferred and which has been written in accordance with the PPL code and a latter image which has been written in accordance with the PDL code superposed, the "posterior function" acting in such a manner that the image which has been previously formed in the superposed portion is made to be white and only the image formed later is printed.

The PDL code supplied through the input terminal 1 is subjected to a process in which the line picture code and the image data are discriminated by the discriminating circuit 2. In general, an output terminal 3a of the bit map development circuit 3 is connected to an input terminal 3c of a resolution memory 4. As a result, the picture line code is developed to a bit map by the bit map development circuit 3 before it is stored in the resolution memory 4. However, in a case where a line picture and an image are mixed in the address of the same pixel, the input terminal 3c of the resolution memory 4 is, if necessary, switched over to a "0" output terminal 3b by a resolution memory control signal line 2c. Then, the pixels in a portion which superposes on the image are made to be "0" by a synchronous signal (omitted from illustration).

Image data discriminated by the discriminating circuit 2 is, by the above-described synchronous signal (omitted from illustration), stored in the gradation memory 11 through the similar process according to the first embodiment. Similarly to the first embodiment, line picture data and the image data are synthesized by the image synthesizing circuit 6. According to this embodiment, the structure is arranged in such a manner that the synthetic circuit 6 gives priority to the posterior image data in a case where the image data is posterior data. Therefore, a pixel in which the line picture data and the image data overlap, the line picture data is made to be "0" so as to maintain the image data.

FIG. 2B illustrates the structure of the discriminating circuit 2 shown in FIG. 2A. Referring to FIG. 2B, reference numeral 210 represents a PDL code buffer which is a memory for storing a PDL code transferred from the host computer. Reference numeral 211 represents a PDL interpreter for analyzing the PDL code so as to develop it to image data for each pixel. Reference numeral 212 represents a development memory for temporarily storing developed pixel data. Reference numeral 213 represents a selector for selecting the output side A in a case where the image stored in the memory is a line picture so as to transmit the image to the bit map development unit 3 via the branch line 2a. In a case where the stored image is image data, the selector 213 selects the output side B so as to transmit it to the block formation circuit 9 via the branch line 2b.

The selector 213 is controlled as follows: the PDL interpreter 211 transmits a signal 2e denoting the fact that the subject code is a line picture code or image data to a discrimination control circuit 214 at the time of analyzing the PDL code. In accordance with this, the discrimination control circuit 214 transmits a selection signal 2d to the selector so as to control the selection of the data output.

The above-described "posterior" control is performed as follows: the PDL interpreter 211 detects the portion in which the line picture data and the image data superpose so as to transmit a signal 2f denoting whether the subject data is data about the pixel in the superposed portion to the discrimination control circuit 214. The discrimination control circuit makes a reference to the PDL code buffer 210 through a signal line 2g so as to detect the "posterior data" to be given priority from the superposed portions, the detected "posterior data" being then transmitted as discrimination signal 2c.

Thus, if the posterior data is image data, data "0" on the side 3b is selected by the selector 3c in response to the discrimination signal 2c. In the image synthetic unit 6, the image data and the masked line picture data are synthesized as it is so that image in which priority is given to the image transmitted to a raster formation circuit 7 (process A). On the other hand, if the posterior data is line picture data, the selector 3c selects the bit map data on the side 3 so that line picture data is selected while priority to the image data being given thereto in the image synthetic unit 6 (process B).

The discrimination signal 2c also is capable of controlling the operation unit 202. That is, the line picture priority mode or the image priority mode is selected by a mode switch of the operation unit 202 provided for the image storage unit. In response to a mode signal 2h denoting the result of the selection, the discrimination signal 2c is transmitted in such a manner that the process B is performed in the case of the line picture priority mode even if the image is the posterior data and the process A is performed in the case of the image priority mode.

Figure 2C:
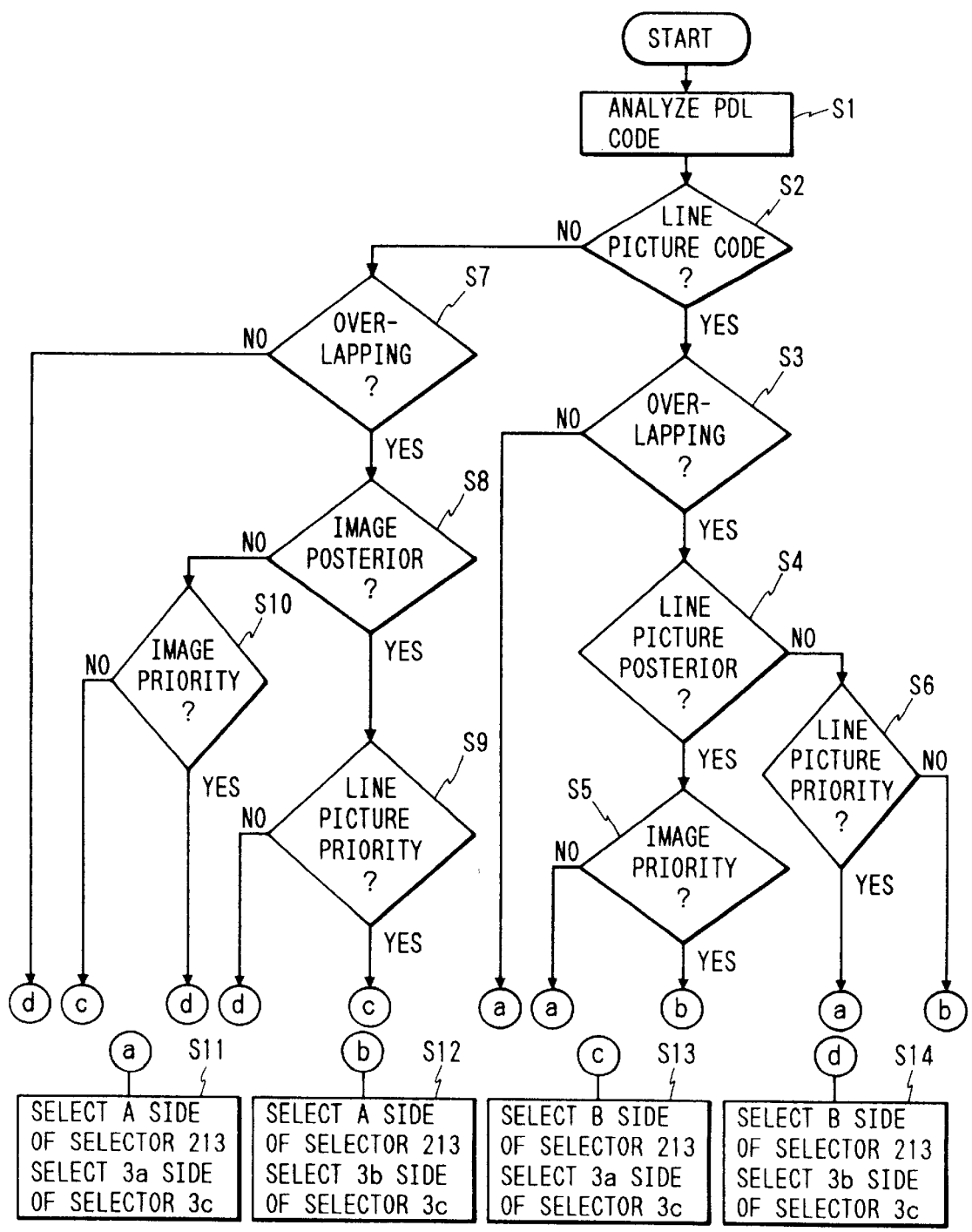

The flow of the above-described process is shown in FIG. 2C.

In step S1, the PDL interpreter 211 analyzes the supplied PDL code.

In step S2, the PDL interpreter 211 transmits the signal 2e denoting whether it is the line picture code to the discrimination control circuit 214.

In steps S3 and S7, the PDL interpreter 211 transmits the signal 2f denoting whether or not it is the superposed portion of the line picture data and the image data to the discrimination control circuit 214.

In steps S4 and S8, the discrimination control circuit 214 makes a reference with the PDL code buffer 210 by using the signal line 2g so as to discriminate the line picture data or the image data to which priority is given.

In steps S5, S6, S9 and S10, the discriminating control circuit 214 discriminates the subject mode is the line picture priority mode or the image priority mode in response to the mode signal 2h supplied from the operation unit 202.

In accordance with the thus-made discrimination, the discrimination control circuit 214 transmits the selection signals 2c and 2d so as to select the selector shown in steps S11 to S14.

[Embodiment 3]

FIG. 3 is a block diagram which illustrates a third embodiment of the present invention in which the blocks having the same functions as those according to the embodiment shown in FIG. 1 are given the same reference numerals.

Although only monochrome line pictures can be processed in the first and second embodiments, color image formation can also be formed in each blocks of the line pictures by providing a second gradation memory 13. The line picture code discriminated by the discrimination circuit 2 is developed to bit map information for each pixel by the bit map development circuit 3. Then, it is formed into blocks each of which is made of 8×8 pixels by the block formation circuit 15 structured similarly to that according to the above-described embodiment. Simultaneously, color information for each color block is stored in the gradation memory 13 while being synchronized with the above-described color formation process. That is, information denoting the color the resolution data of which shows "1" in the block is stored in the gradation memory 13.

On the other hand, image data discriminated by the discrimination circuit 2 is, in response to the above-described synchronous signal (omitted from illustration) stored in the gradation memory 11 after it has been subjected to the similar process to that performed according to the first embodiment. The line picture data and the color data are, in a unit of blocks, synthesized by an image synthetic circuit 16 so that color (multi-value) line picture data is transmitted from the image synthetic circuit 16. Furthermore, the line picture data, the color data and the synthetic data of the line picture data and the color data respectively pass through the output signal lines 4a, 13a and 12a before they are synthesized by the image synthetic circuit 6. Then, the synthetic image is rastered by the raster formation circuit 7 before it is transmitted to the output device through the output terminal 8.

The above-described third embodiment is an application of the first embodiment which enables colors to be added to the line picture data. However, it can be executed as an application of the second embodiment.

[Embodiment 4]

Figure 4:
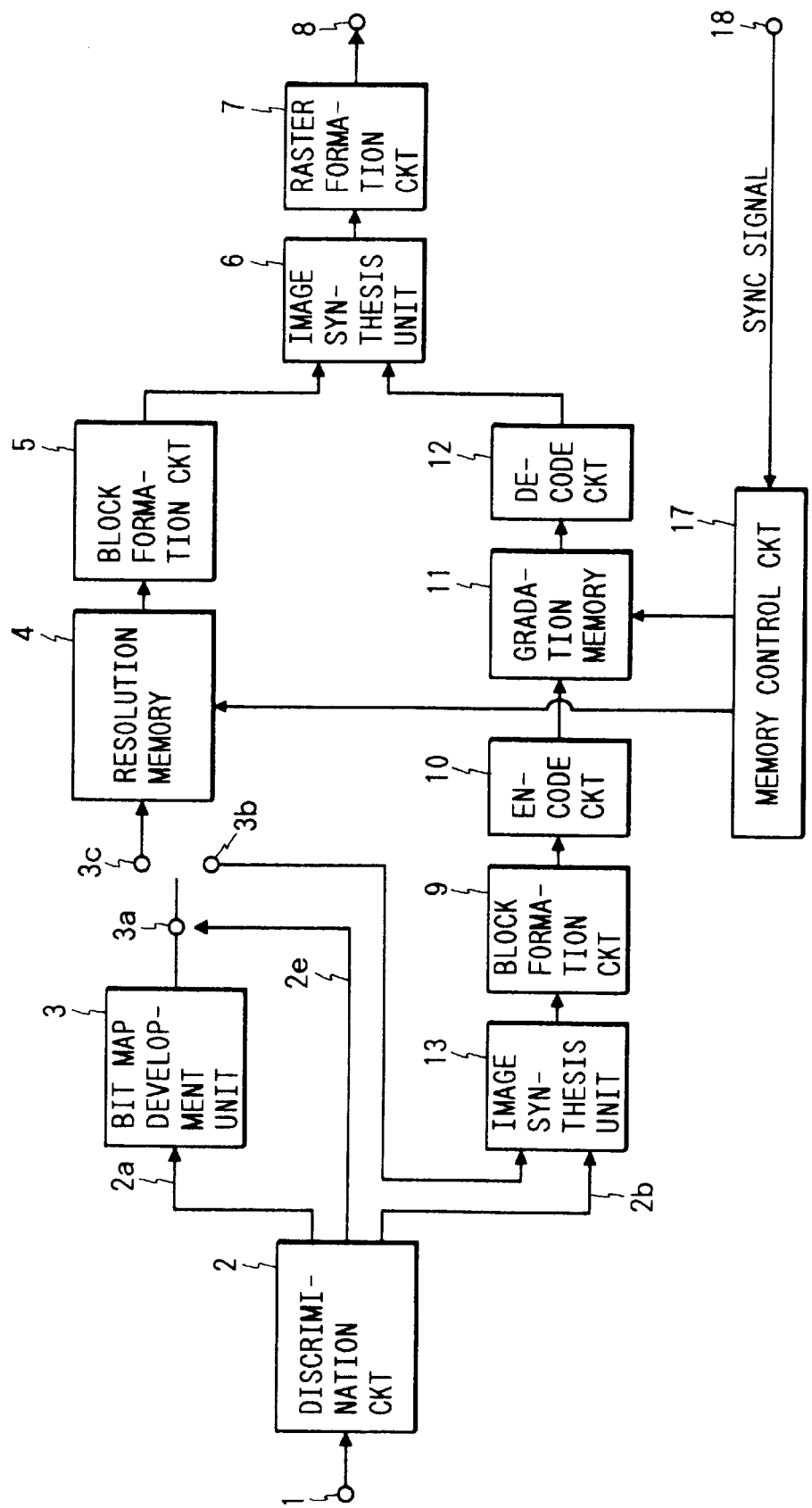
FIG. 4 is a block diagram which illustrates a fourth embodiment of the image processing apparatus according to the present invention.
Figure 5:
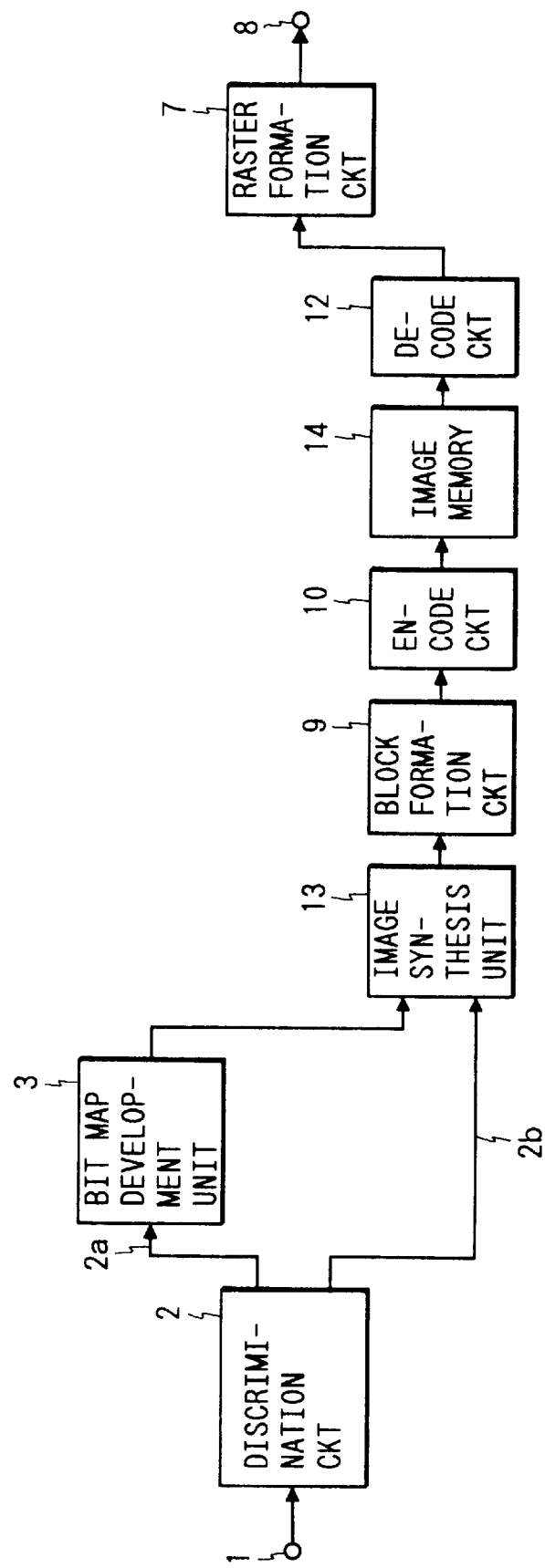
FIG. 5 is a block diagram which illustrates a conventional image processing apparatus.

FIG. 4 is a block diagram which illustrates the structure of a fourth embodiment of the present invention, where blocks having the same functions as those according to the embodiment shown 1 are given the same reference numerals.

The line picture discriminated and encoded by the discrimination circuit 2 contains a great quantity of halftone images such as computer graphs. The discriminating circuit 2 discriminates a half-tone image code (not image data for each pixel) so as to connect the terminal 3a, which is a selector, to a terminal 3d through the control signal line 2e when the discrimination circuit 2 transmits the half-tone image code to the branch line 2a. The half-tone image data bit-map-developed by the bit map developing circuit 3 is synthesized with the image data supplied through the branch line 2b while establishing synchronization. The synthetic image data is transmitted to the block formation circuit 9 so that it is formed into blocks composed of 8×8 pixels (one pixel is composed of 256 gradations) by the block formation circuit 9 before it is stored as a compressed image in the gradation memory 11 through the encoding circuit 10.

On the other hand, in a case where the line picture code is a line image or a font (except for a character having a half-tone image), the discriminating circuit 2 connects the terminal 3 and the terminal 3c to each other through the control signal line 2e. The line picture code is bit-map-developed by the bit map developing portion 3 before it is stored in the resolution memory 4. The image data discriminated by the discriminating circuit 2 is transmitted to the branch line 2b before it is synthesized by the image synthesizing circuit 13 with the half-tone image while establishing synchronization. The synthesized half-tone image data and the image data are formed into blocks by the block formation circuit 9 before it is stored as a compressed image in the gradation memory 11 after it has passed through the encoding circuit 10.

The line picture data stored in the resolution memory 4 is formed into blocks by the block formation circuit 5, while the half-tone image data (image data included) stored in the gradation memory 11 is decoded by a decoding circuit 12. They are synthesized by the image synthetic circuit 6 while establishing synchronization before it is subjected to the raster formation process by the raster formation circuit 7. Then, it is transmitted to the output device through the output terminal 8.

The above-described fourth embodiment may be combined with the second embodiment so that the "posterior" mode is realized. As an alternative to this, the line picture may be colored by being combined with the third embodiment. The fourth embodiment may be combined with both the second and third embodiments.

As described above, according to the present invention, the reproducibility of both of the line picture and the half-tone image such as an image can be improved. Furthermore, it is able to give priority to the resolution in the case of the line picture, it is able to give priority to the gradation in the case of the half-tone image.

The encoding method employed by the encoding circuit according to first to fourth embodiments is the same as that which is employed in a fifth embodiment to be described later.

[Embodiment 5]

Figure 6:
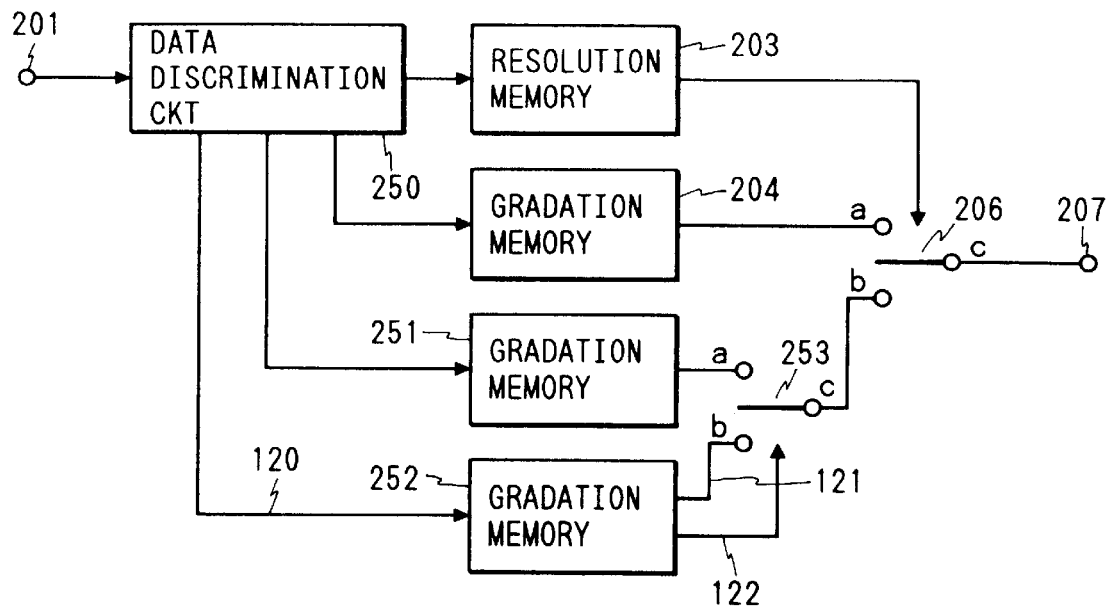
FIG. 6 is a block diagram which illustrates a fifth embodiment of the image processing apparatus according to the present invention.

FIG. 6 is a block diagram which illustrates the image storage unit of the image processing apparatus according to a fifth embodiment of the present invention. Referring to FIG. 6, reference numeral 201 represents an input terminal, 203 represents a resolution memory, 250 represents a data discriminating circuit, 204, 251 and 252 represent gradation memories, 206 and 253 represent selectors and 7 represents the output terminal.

A host computer or the like is connected to the input terminal 201 so that data received through the input terminal 201 is subjected to a process in the data discriminating circuit 250 in which a command, for example, information about the header or the like, is interpreted. Then, the bit map data of the text is stored in the resolution memory 203, gradation (color) data about the text is stored in the gradation memory 204, the background color showing the color of the pixels except for those for the text is stored in the gradation memory 251 and image data possessing the half-tone image is stored in the gradation memory 252. Data for one page is transmitted, from the hose computer (omitted from illustration) to each of the above-described memories. As a result, the operation of reading the memory is controlled in such a manner that, when the rotation of the engine of the printer has been commenced, data corresponding to each pixel is, starting from the leading portion of the page, read from the resolution memory 203, the gradation memories 204, 251 and 252 in response to a synchronous signal supplied from the printer unit. The output (that is, the background color) from the gradation memory 251 is connected to the terminal a of the selector 253, while the output (that is, the image data) from the gradation memory 252 is connected to the terminal b. Furthermore, an image area signal 122 denoting the pixel other than the pixels the image data of each of which is "C" transmitted from the gradation memory 252 is received by a control terminal. When the subject pixel is in the-image area, image data is transmitted to the terminal c of the selector 252, while the background color is transmitted to the same when the subject pixel is out of the image area (is supplied to the terminal b of the selector 206).

In accordance with data transmitted from the resolution memory 203, the selector 206 selects data at the terminal a (that is, data in the gradation memory 204) as the color to be colored when data in the resolution memory 203 is "1", while the same selects data at the terminal b (that is, data in the gradation memory 205) as the background color when data in the resolution memory 203 is "0", the selected gradation data being transmitted through the output terminal 207 to the printer engine.

Data to be stored in the resolution memory 203 is data to act to switch over the data in the gradation memory and that in the selector 253, the data being arranged according to this embodiment to be 1-bit data for each pixel for the purpose of maintaining the resolution level.

Full gradation data (according to this embodiment, 24 bits in total composing of 8 bits for each red, green and blue) is stored in each of the gradation memories 204 and 251. In order to reduce the memory capacity, the number of the pixels (resolution) is limited. That is, a block of 8×8 pixels possess color data according to this embodiment.

Figure 7:
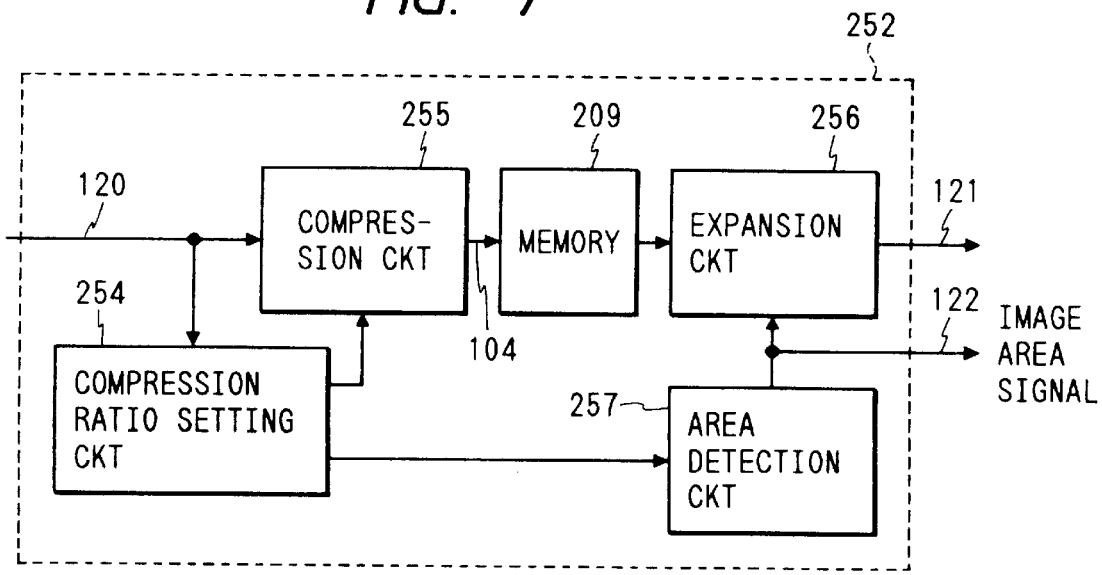
FIG. 7 illustrates the schematic structure of a gradation memory.

FIG. 7 is block diagram which illustrates the schematic structure of the gradation memory 252. Referring to FIG. 7, reference numeral 209 represents a multi-value memory, 254 represents a compression ratio setting circuit, 255 represents a compression circuit, 256 represents an expansion circuit and 257 represents an area detection circuit.

Figure 8:
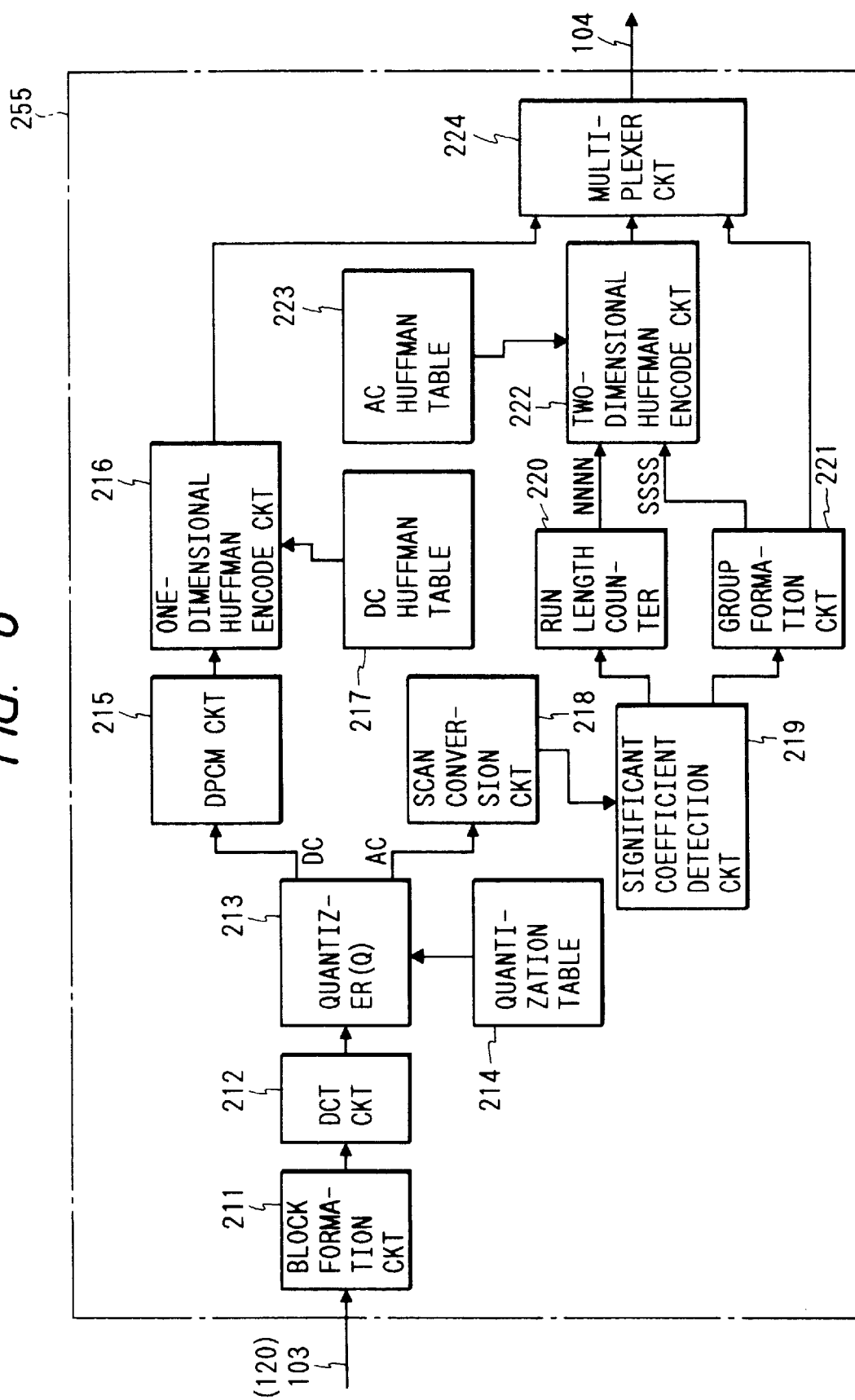
FIG. 8 illustrates an example of the schematic structure of a compression circuit.

The discrimination command for the image data has the leading address of the image region and the size of the image area, that is, the width and the height set therein. The compression ratio setting circuit 254 calculates the quantity of data in the image area from the width and the height of the image area. Furthermore, the compression ratio setting circuit 254 sets the compression ratio in accordance with the ratio between the above-described quantity of data and the capacity of the memory 209 so as to transmit the compression ratio to the compression circuit 255. The compression circuit 255 is structured as shown in FIG. 8 in which the quantizing condition is controlled so as to realize the set compression ratio, the controlled quantizing condition being stored in the memory 209. In the compression ratio setting circuit 254, the coordinate values of the start point and end point of the image area from the command information so as to set the above-described coordinate values to each of the registers of the area detection circuit 257. The area detection circuit 257 is a circuit structured similarly to an area detection circuit 233 shown in FIG. 12 to be described later.

On the other hand, when the operation of the printer engine has been commenced, the area detection circuit 257 discriminates whether or not the subject pixel is the pixel in the image area in synchronization with the HSYNC for the printer. If the area detection circuit 257 has determined that the subject pixel is in the image area, it transmits the image area signal through the signal line 122. When the image area signal has been received by the expansion circuit 256, compressed data stored in the memory 209 is expanded to the original image data so as to be transmitted through the signal line 121.

The compression circuit 255 is a compression encoding circuit for performing known encoding processes such as the perpendicular conversion encoding process, the vector quantizing process, the block encoding process or the like. According to this embodiment, the compression ratio is set to a considerably high value in order to reduce the memory capacity. Therefore, a non-reversible encoding method is employed. Therefore, the resolution cannot be stored. However, a reversible encoding method such as run length, encoding method can, of course, be employed.

Figures 25, 26:
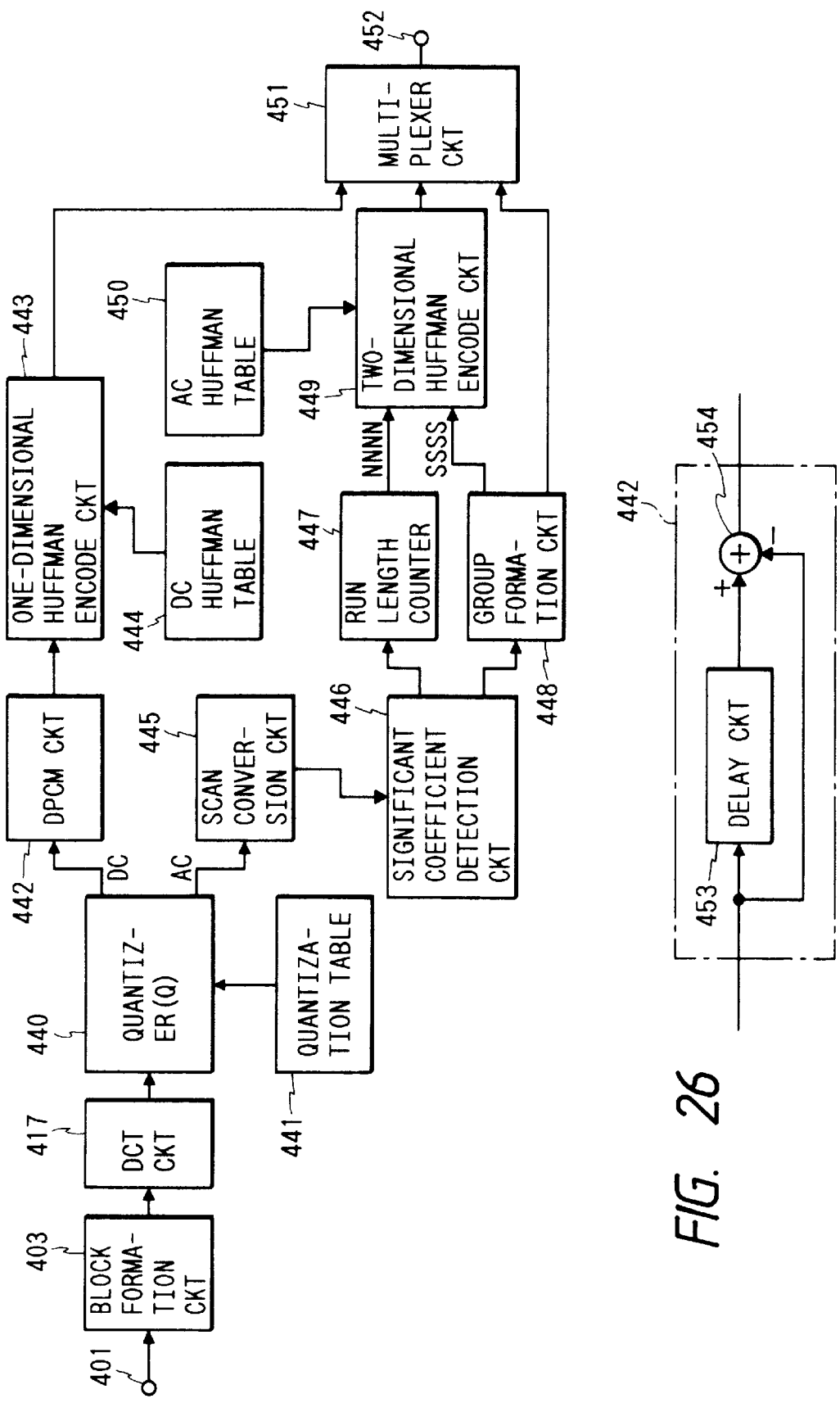
FIG. 25 is a block diagram which illustrates the structure of a convention encoding method.
FIG. 26 is a detailed block diagram which illustrates the structure of a predictive encoding circuit shown in FIG. 4.

FIG. 8 is a block diagram which illustrates the schematic structure of the compression circuit 255. According to this embodiment, an encoding portion of the Baseline System is, as the international standard method of encoding a color still image, illustrated which is disclosed by JPEG (Joint Photographic Experts Group), which is a consortium of the ISO and the CCITT (FIG. 25 is a block diagram which illustrates an encoding method ("Internationalized Encoding of Color Still Image", disclosed by Yasuda, pp. 398–407, No. 6, Vol. 18, 1989, published by the Image Electronics Society).

Figure 9:
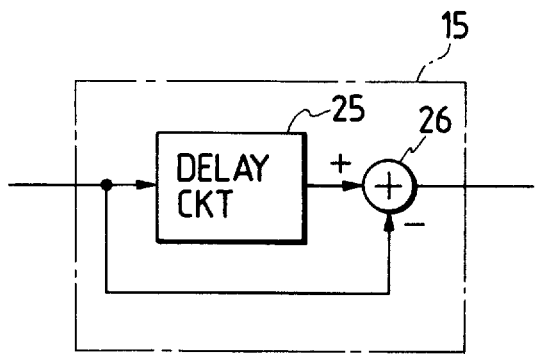
FIG. 9 illustrates an example of the schematic structure of a predictive encoding circuit (DPCM)

Image data for each pixel supplied through the signal line 103 is formed into blocks, each of which is composed of 8×8 pixels, by the block formation circuit 211 constituted by line memories for a plurality of lines. Then, the block is subjected to a cosine transformation in a discrete cosine transformation (DCT) circuit 212 before the transformation coefficient is supplied to a quantizer (Q) 213. The quantizer 213 linear-quantizes the transformation coefficient in accordance with quantization step information supplied from a quantizer table 214. A DC coefficient among the quantized transformation coefficients is, by a predictive encoding circuit (DPCM) 215, subjected to a subtraction process in which the difference (estimated error) from the DC component in the previous block is calculated. The different thus-obtained is then supplied to a Huffman encoding circuit 216. FIG. 9 is a block diagram which illustrates the detailed structure of the predictive encoding circuit 215. The DC coefficient quantized by the quantizer 213 is supplied to a delay circuit 225 and a subtracter 226. The delay circuit 225 is a circuit in which the discrete cosine transformation circuit is delayed by one block, that is, by the time necessary to calculate data for 8×8 pixels. Therefore, the DC coefficient of the previous block is supplied from the delay circuit 225 to the subtracter 226. As a result, the subtracter 226 transmits the difference (predictive error) in the DC coefficient from the previous block (since the predictive encoding circuit according to this embodiment uses the value of the previous block as the predictive value, the predictive encoding circuit is composed of the delay circuit as described above).

A Huffman encoding circuit 216 variable-length-encodes a predictive error signal supplied from the predictive encoding circuit 215 in accordance with the DC Huffman code table 217 so as to supply a Huffman code to a multiplexer circuit 224.

Figure 10A:
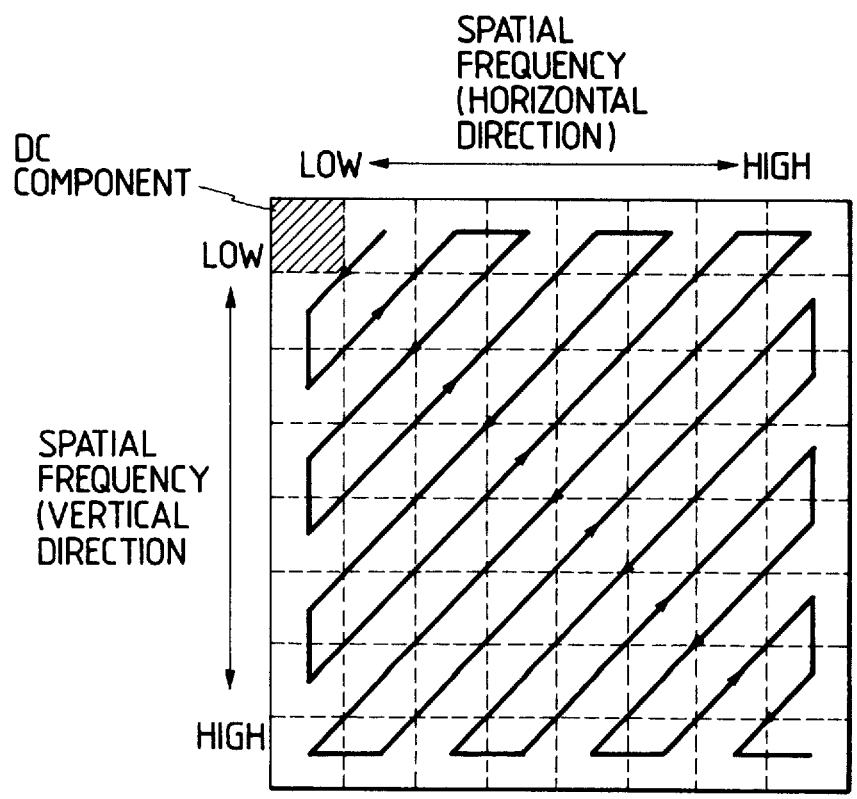
FIGS. 10A and 10B respectively illustrate the scanning order to DCT coefficients.
Figure 10B:
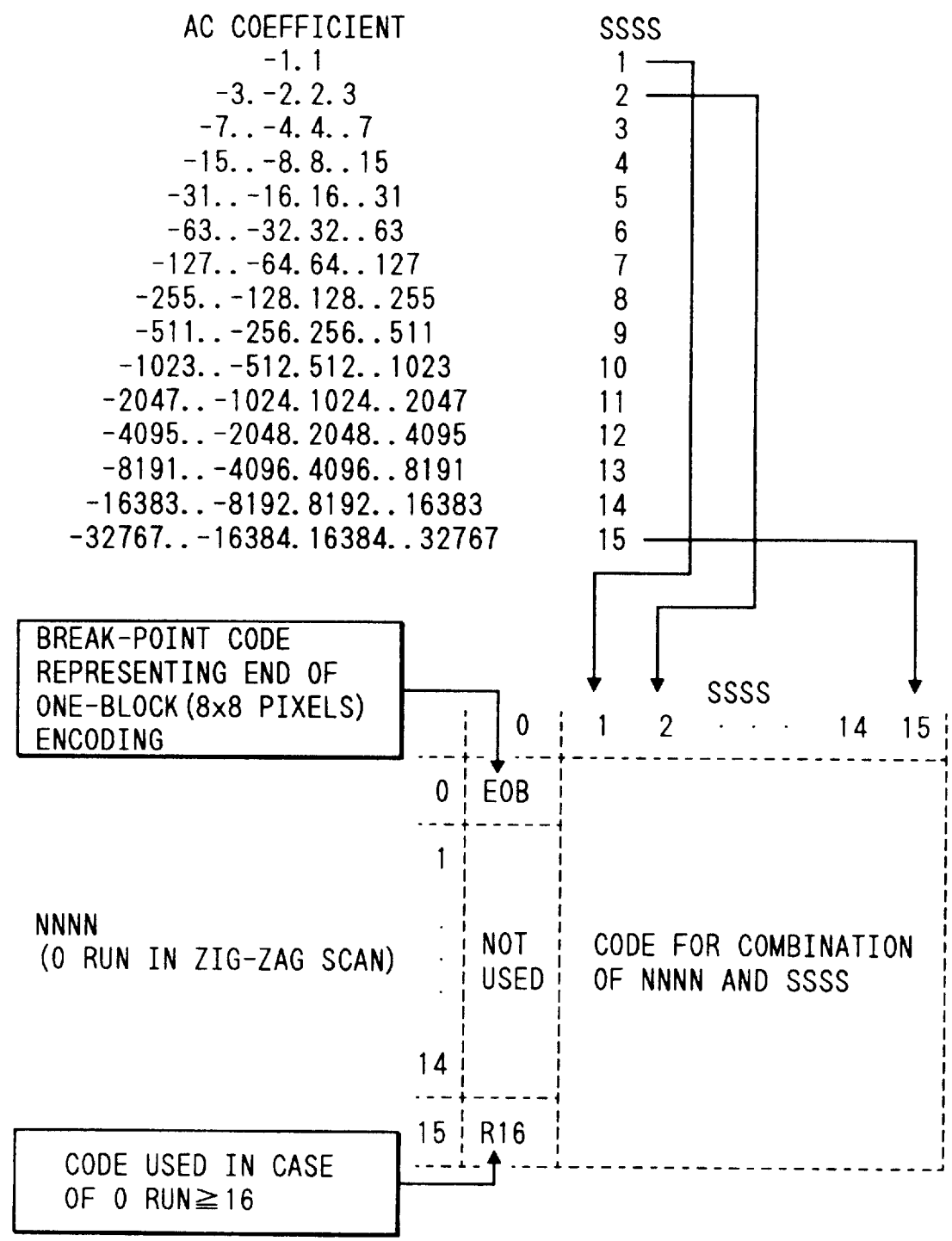

On the other hand, AC coefficients (coefficients except for the DC coefficient) quantized by the quantizer 213 are zigzag-scanned by a scan conversion circuit 218 in ascending order as shown in FIG. 10A so as to be supplied to a significant coefficient detection circuit 219. The significant coefficient detection circuit 219 judges whether or not the quantized AC coefficient is "0". If it is "0", the significant coefficient detection circuit 219 supplies a count-up signal to a run length counter 220 so that the value of the counter is increased by one. If the AC coefficient is not "0", a reset signal is supplied to the run length counter 220 so as to reset the value of the counter. Furthermore, the coefficient is, by a group formation circuit 221, sectioned into group number SSSS and an additional bit as shown in FIG. 10B. The group number SSSS is supplied to the Huffman encoding circuit 222, while the additional bit is supplied to the multiplexer circuit 224. The above-described run length counter 220 is a circuit for counting a run length of "0"'s and as well as supplying number NNNN of "0"'s present between significant coefficients except for "0" to a Huffman encoding circuit 222. The Huffman encoding circuit 222 variable-length-encodes the supplied run length NNNN of "0"'s and the group number SSSS of the significant coefficient in accordance with an AC Huffman code table 223 so as to supply them to the multiplexer circuit 224.

The multiplexer circuit 224 multiplies the DC Huffman code for one block (input pixels 8×8), the AC Huffman code and the additional bit so as to transmit compressed image data through an output terminal 104.

Therefore, the memory capacity can be reduced by storing the compressed data transmitted from the signal line 104 and by expanding the same at the time of reading by the reversed operation to that performed at the time of the reading operation.

Since the expansion circuit 256 is a circuit for performing the reversed operation to that performed by the compression circuit 255, its description is omitted here.

Figure 11:
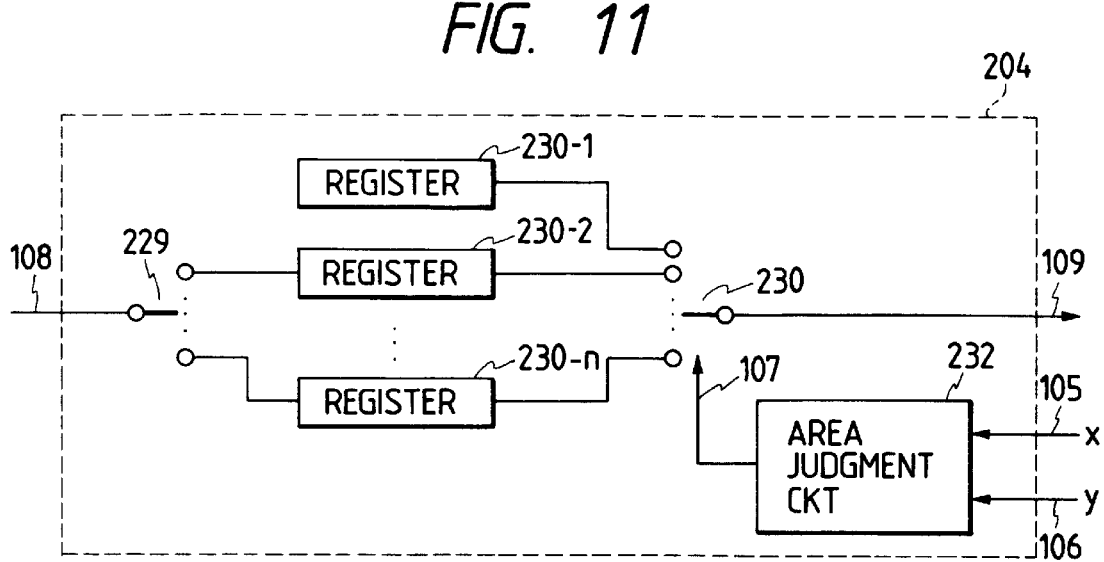
FIG. 11 illustrates the schematic structure of second gradation memory.

FIG. 11 is a block diagram which illustrates the schematic structure of the gradation memories 204 and 251. Referring to FIG. 11, reference numerals 229 and 231 represent selectors, 230-1 to 230-n represent register groups and 232 represents an area discriminating circuit.

Gradation data received through the signal line 108 is sequentially stored in the registers 230-2 to 230-n by the selector 229. The register 230-1 has default gradation data (for example, it is white in the gradation memory 204, while the same is white in the gradation memory 251) set therein. The area discriminating circuit 232 discriminates the area in which the gradation data stored in each of the registers is significant in accordance with the coordinate value of data output from the resolution memory 203 through the signal lines 105 and 106. Furthermore, the area discriminating circuit 232 controls the selector 231 so as to transmit significant gradation data through the signal line 109.

Figure 12:
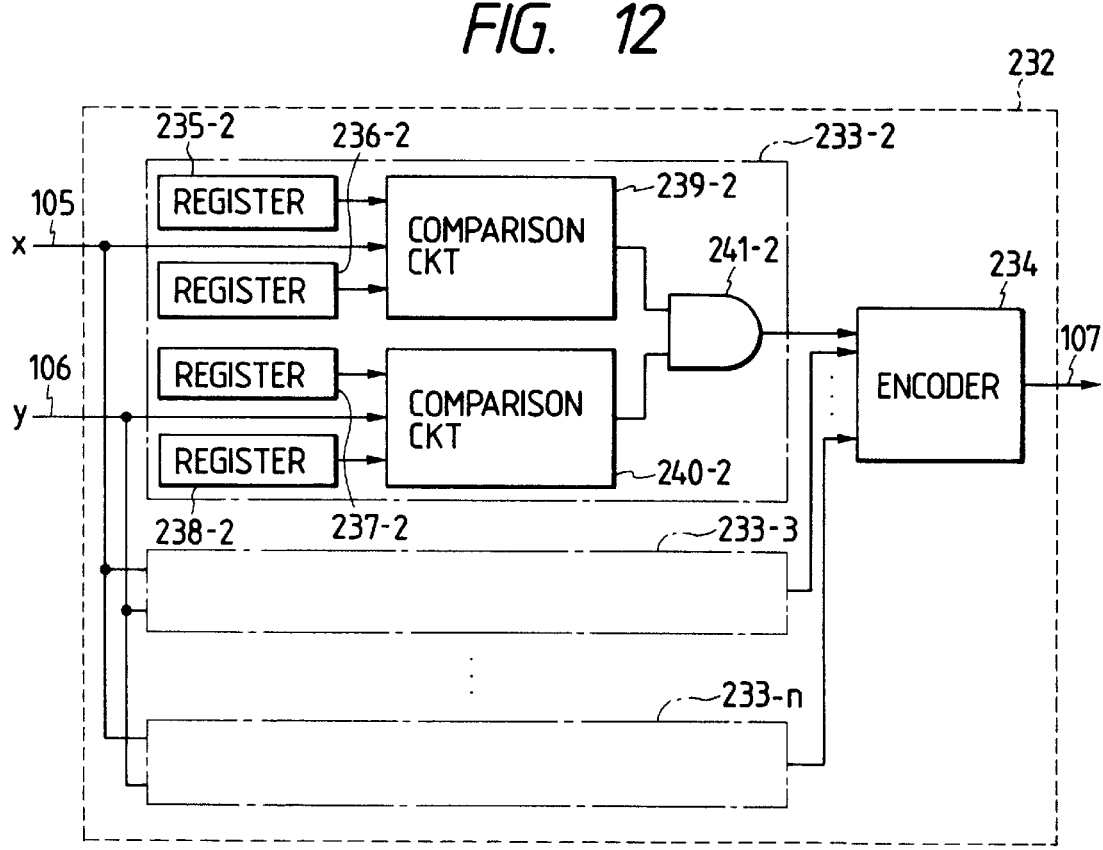
FIG. 12 illustrates an example of the schematic structure of an area judgement circuit.

FIG. 12 is a block diagram which illustrates the schematic structure of the area discriminating circuit 232. Referring to FIG. 12, reference numeral 233 represents an area detection circuit, 234 represents a priority encoder, 235, 236, 237 and 238 represent registers, 239 and 240 represent comparison circuits and 241 represents an AND circuit.

Figure 13:
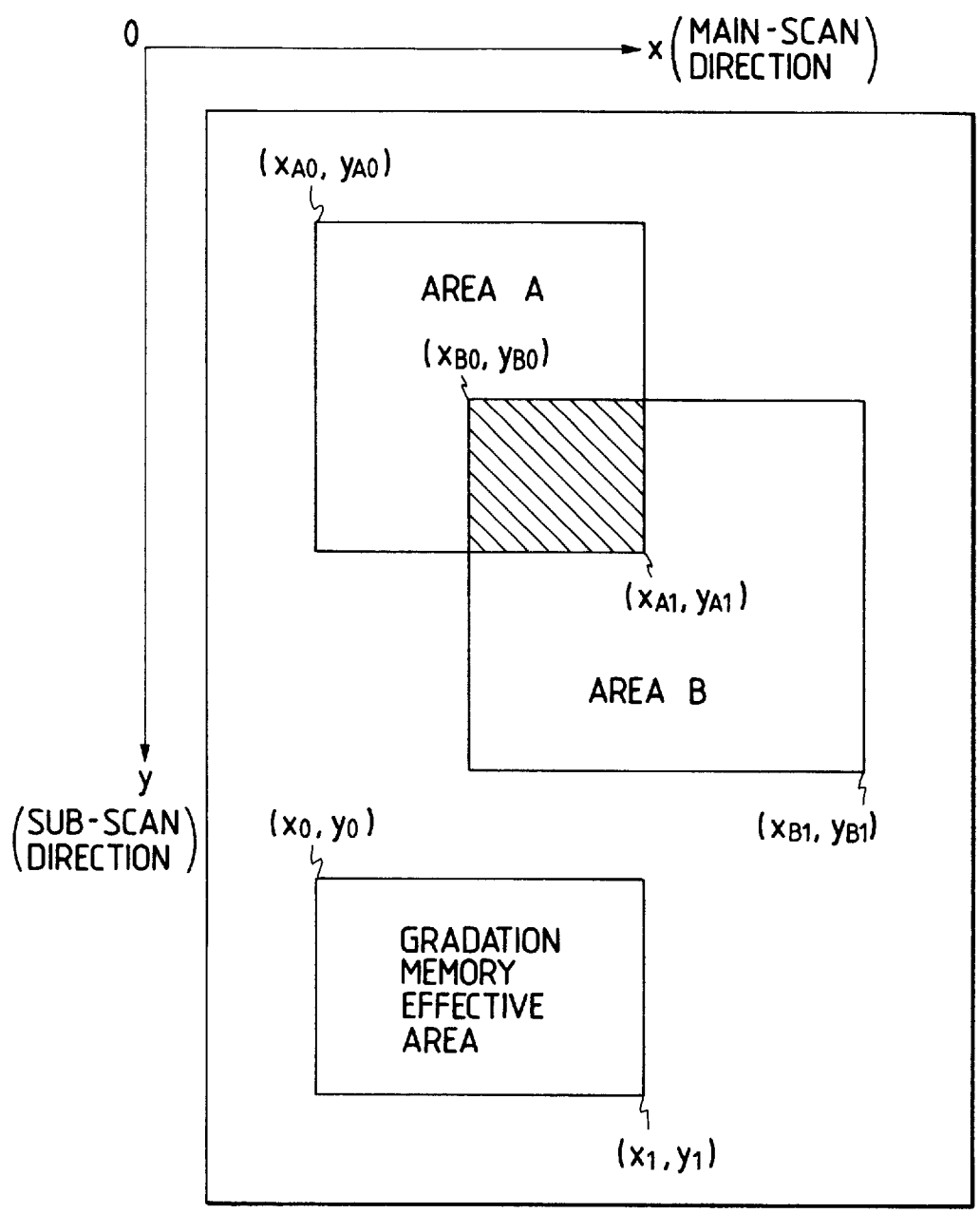
FIG. 13 illustrates an effective area of the gradation memory on a page.

According to this embodiment, the significant area of each of the gradation registers 230-2 to 230-n is limited to a rectangular shape as shown in FIG. 13, the significant area being defined by a point $(x_0, y_0)$ (the upper left corner of the rectangle shown in FIG. 13 to be hereinafter called "start point") which is first scanned and a point $(x_1, y_1)$ (the lower right corner of the rectangle shown in FIG. 13 to be hereinafter called "end point") which is scanned finally. Referring to FIG. 13, the x-axial direction is arranged to be the main scanning direction, while the y-axial direction is arranged to be the subscanning direction. The coordinate values $(x_0, y_0)$ and $(x_1, y_1)$ of the above-described start and end points discriminated by the data discriminating circuit 202 are stored in each of registers 235, 236, 237 and 238 of the area detection circuit 233 which corresponds to the gradation register 230 shown in FIG. 11.

On the other hand, at the time of printing out data, the coordinate value of pixel data which has been read out from the resolution memory 203 is received through the signal lines 105 and 106. The first comparison circuit 239 makes a comparison between x-coordinate value x of the above-described resolution memory 203 and x-coordinate values $x_0$ and $x_1$ of the start and end points. If $x_0 \leq x \leq x_1$, "1" supplied to an AND circuit 41, while, when $x<x_0$ or $x>x_1$, "0" is supplied to the same. Similarly, the second comparison circuit 240 supplies "1" if $y_0 \leq y_1$ to the AND circuit 241, while the same supplies "0" if $y<y_0$ or $y>y_1$. Therefore, "1" is transmitted from the AND circuit 241 in a case (i) where $x_0 \leq x \geq x_1$ and as well as $y_0 \leq y \leq y_1$. In the case (ii) except for (i), "0" is transmitted. As a result, the area detection can be performed. The result of the detection performed by each of the area detection circuits 233-2 to 233-n is subjected to a process in which the number of the area of the detection areas which is finally set is encoded by a priority encoder 234 for the purpose of judging the priority of the superposed portion designated by a diagonal portion shown in FIG. 13 so as to be transmitted through a signal line 107. That is, the area in the superposed portion set later is judged to be significant. In a case where all of the results of the discrimination operations of the areas are "0", the priority encoder 234 transmits "0" so as to cause the selector 231 to select the gradation data (that is, the default value) in the gradation register 230-1 shown in FIG. 11.

Usually, the resolution memory 203 stores dot resolution data which must have high resolution such as text, while the gradation memory 205 stores data which must have high gradation such as an image. The gradation (color) data of the text data is stored in the gradation memory 204. In a case where the gradation (color) of the text data is constant (that is, monotone) in the overall area of one page, or in a case where the background (background color) is constant (monotone) and as well as the text data superposing on the image portion is the above-described background color, the contents in the gradation memory 204 is only default data. Therefore, the necessity of using the registers from the above-described area discriminating circuits 230 and 230-2 can be eliminated.

The gradation memory may be structured in such a manner that one gradation (color) is set for in units of a block composed of, for example 8 (pixels)×8 (lines).

The resolution memory 203 is a memory in which one bit for each pixel has a capacity of one page. In this memory, the correlation between pixels is considerably high since it is used to switch over the gradation data. Therefore, the quantity of data can be compressed by using the reversible data compression encoding method shown in FIG. 17.

Figure 17:
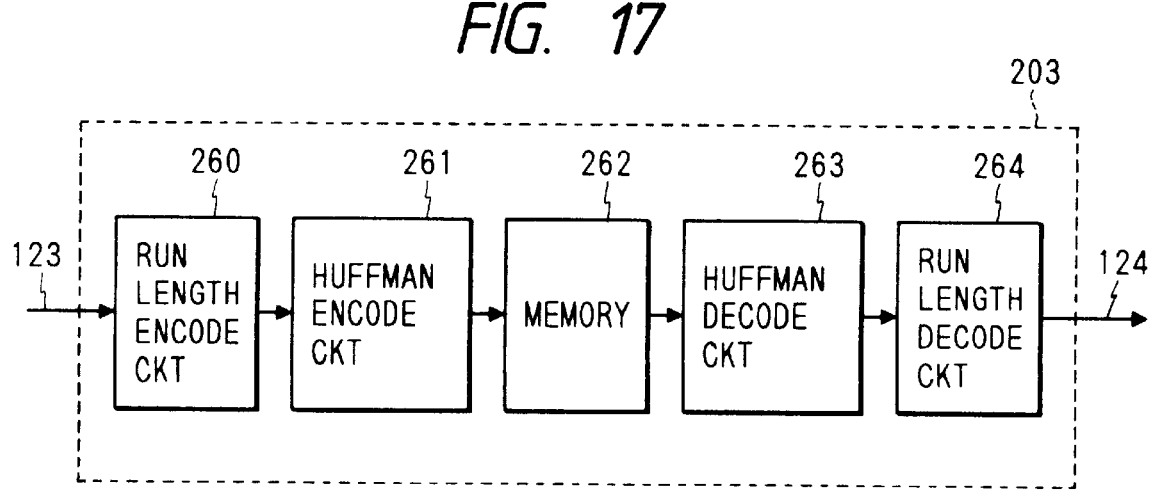
FIG. 17 illustrates another example of the schematic structure of a resolution memory.

FIG. 17 is a block diagram which illustrates another embodiment of the resolution memory 203. Referring to FIG. 17, reference numeral 260 represents a run length encoding circuit, 261 represents a Huffman encoding circuit, 262 represents a memory, 263 represents a Huffman decoding circuit and 264 represents a run length decoding circuit. Since the run length and Huffman encoding and decoding circuits are well known, their descriptions are omitted here.

The figure illustrates the overall structure of this embodiment of the image processing apparatus including the image storage unit shown in FIG. 6 is the same as that of FIG. 1B.

As described above, this embodiment comprises an image memory for compressing and storing continuous gradation data such as image data by utilizing the correlation between pixels and visual characteristics, a gradation memory for storing the text color (drawing color) or the background color for each specific area and a resolution memory for storing the dot resolution of pixel data. The output data from the above-described image memory and that from the gradation memory is switched over in response to the output signal from the resolution memory. As a result, the memory capacity can be reduced while maintaining both of the image quality of the text and that of the image.

[Embodiment 6]

Figure 14:
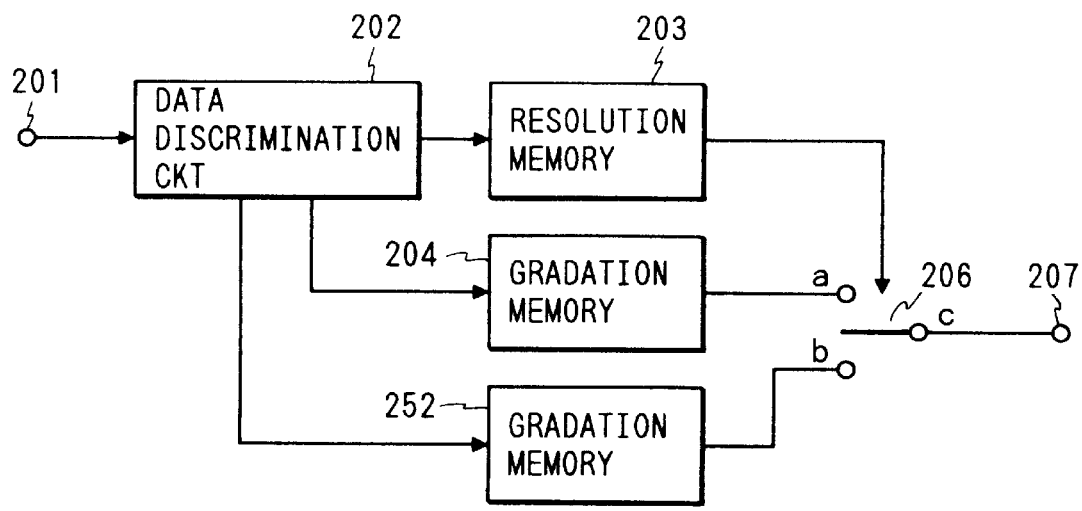
FIG. 14 is a block diagram which illustrates the structure of a sixth embodiment of the present invention.

FIG. 14 is a block diagram which illustrates the structure of a sixth embodiment of the image processing apparatus according to the present invention. Referring to FIG. 14, the elements having the same functions as those shown in FIG. 6 are given the same reference numerals. Therefore, the elements different from those shown in FIG. 6 will be described.

Referring to FIG. 14, reference numeral 202 represents a data discriminating circuit. Data received though the input terminal 201 is subjected to a command information interpretation process in the data discriminating circuit 202. As a result, resolution data for discriminating the background portion is stored in the resolution memory 203, the drawing color in the background color and the image area is stored in the gradation memory 204, the drawing color and image data of the text are stored in the gradation memory 252. Data for one page is transferred to each of the above-described memories 203, 204 and 252 so that the operation of the printer engine is commenced. In response to the synchronous signal of the commencement, data corresponding to each pixel is supplied to the control terminal, the terminal a and the terminal b of the selector 206 from the resolution memory 203, the gradation memories 204 and 252 starting from the leading pixel of the subject page. The selector 206 switches over the background color, which is the output from the gradation memory 204 and the drawing color and the image data of the text, which are the outputs from the gradation memory 252 in response to the output signal from the resolution memory 203. As a result, gradation data is transmitted to the printer engine through the output terminal 207.

According to this embodiment, the resolution of the background can be maintained. Since the number of background colors-in one page is usually considerably small in comparison to the number of the drawing colors required for the text, the capacity of the hardware of the gradation memory 204 can be considerably reduced. In a case where the drawing color of the text is continuously changed (for example, the gradation and the coordinate of the character are deviated by small degrees to overlap the characters), a pseudo-gradation process such as the dither process must be performed according to the fifth embodiment. However, according to this embodiment, an excellent image quality can be obtained by storing the above-described drawing color in the gradation memory 252 which is capable of effectively storing a continuous gradation. Furthermore, since the resolution of the background can be stored, trimming of the image portion can easily performed at the maximum resolution.

[Embodiment 7]

Figure 15:
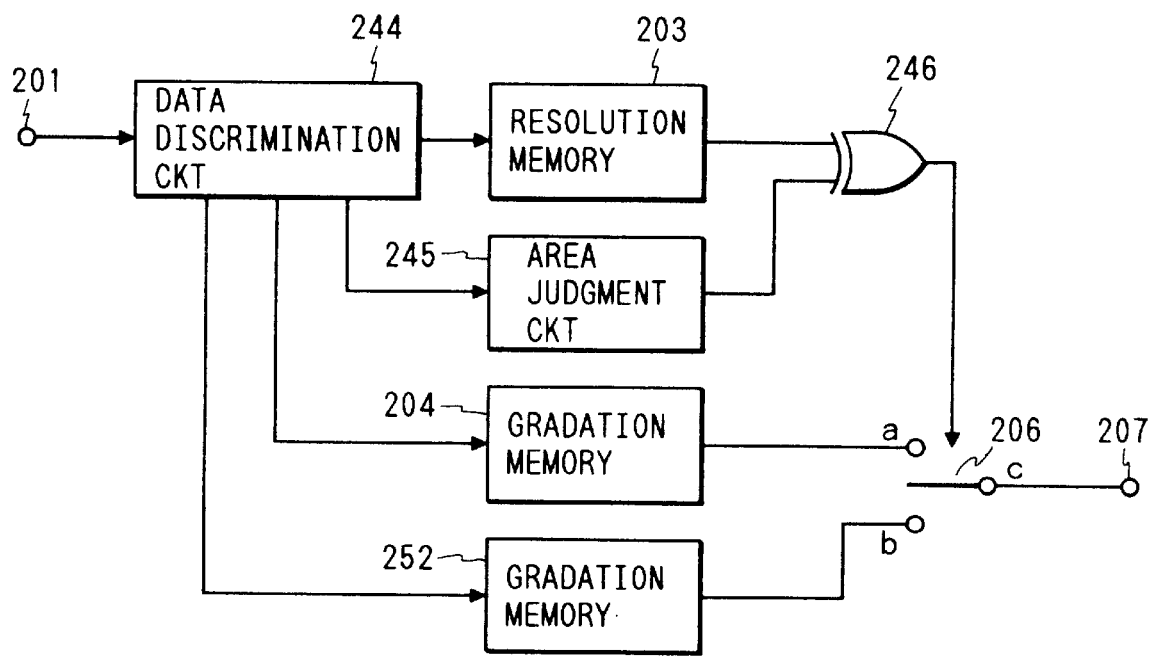
FIG. 15 is a block diagram which illustrates the structure of a seventh embodiment of the present invention.
Figure 16:
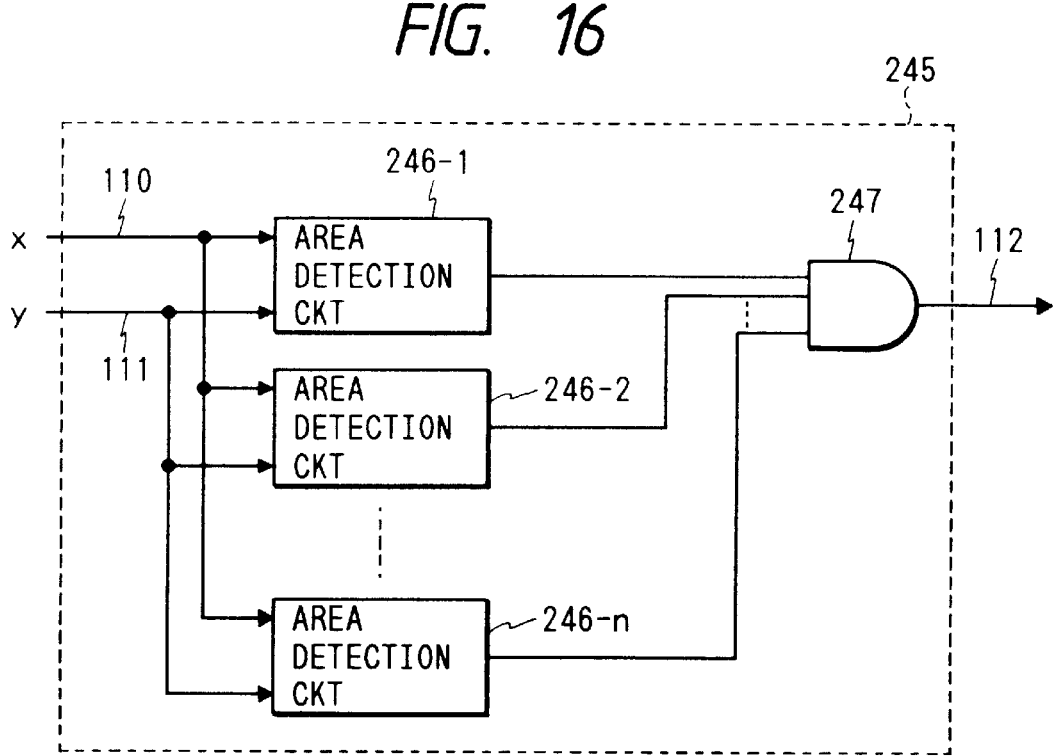
FIG. 16 illustrates another example of the schematic structure of the gradation memory.

FIG. 15 is a block diagram which illustrates the structure of a seventh embodiment of the image storage apparatus according to the present invention. Referring to FIG. 15, the elements having the same functions as those shown in FIG. 6 are given the same reference numerals. Then, the description will be made about the elements different from the embodiment shown in FIG. 6.

Referring to FIG. 15, reference numeral 244 represents a data discriminating circuit, 245 represents an area judgement circuit and 246 represents an EXOR circuit.

Data supplied through the input terminal 201 is subjected to a header information interpretation process in the data discriminating circuit 244 so that bit map data about the background is stored in the resolution memory 203, the background color and the drawing color in the image area are stored in the gradation memory 204 and the drawing color of the text and the image data are stored in the gradation memory 252. The image area is stored in the register of the area judgement circuit 245. Data for one page is transferred to each of the above-described memories 203, 204 and 252 from the host computer so that the operation of the printer engine is commenced. As a result, data corresponding to each pixel is sequentially transmitted starting from the leading pixel of the page from the resolution memory 203, the gradation memories 204 and 252 and the area judging circuit 245. The area judging circuit 245 supplies "1" to either of the terminals of the EXOR circuit 246 if the subject pixel is image data. The output from the resolution memory 203 is connected to another terminal of the EXOR circuit 246. As a result, resolution data in the image area can be reversed. Therefore, in a case of the text pixel in the background and the image region, the selector 206 transmits gradation (color) data at the terminal a, that is, in the gradation memory 204, while the same transmits gradation (color) data at the terminal be, that is, in the gradation memory 205 through the terminal c. Selected gradation data is supplied to the printer engine through the output terminal 207.

According to this embodiment, since the contents of the resolution memory are reversed in the image portion, the overlap writing of text data can easily be performed. That is, according to the sixth embodiment, it is necessary for the host computer to process, as the background data, the text data to be superposed on the above-described image portion. That is, it is necessary to store "1" to the resolution memory 203 in a case of the image portion to which the text is not superposed and and only the text drawing portion outside the image area, while it is necessary to store "0" in the other cases. However, according to this embodiment, the output from the resolution memory 203 in the image area is reversed. Therefore, it is simply necessary to always set the text drawing portion to "1" regardless of whether the position is inside/outside the image region.

According to the fifth to the seventh embodiments, the resolution memory is constituted in such a manner that each pixel is composed of 1 bit. The present invention is not limited to this, however, and a structure may be employed which is arranged in such a manner that the gradation data is selected by four types of gradation memories by composing each pixel by 2 bit.

As described above, the image processing apparatus according to the present invention is capable of forming an image of a mixture of texts and images while possessing excellent image quality by necessitating reduced memory capacity.

[Embodiment 8]

Figure 18:
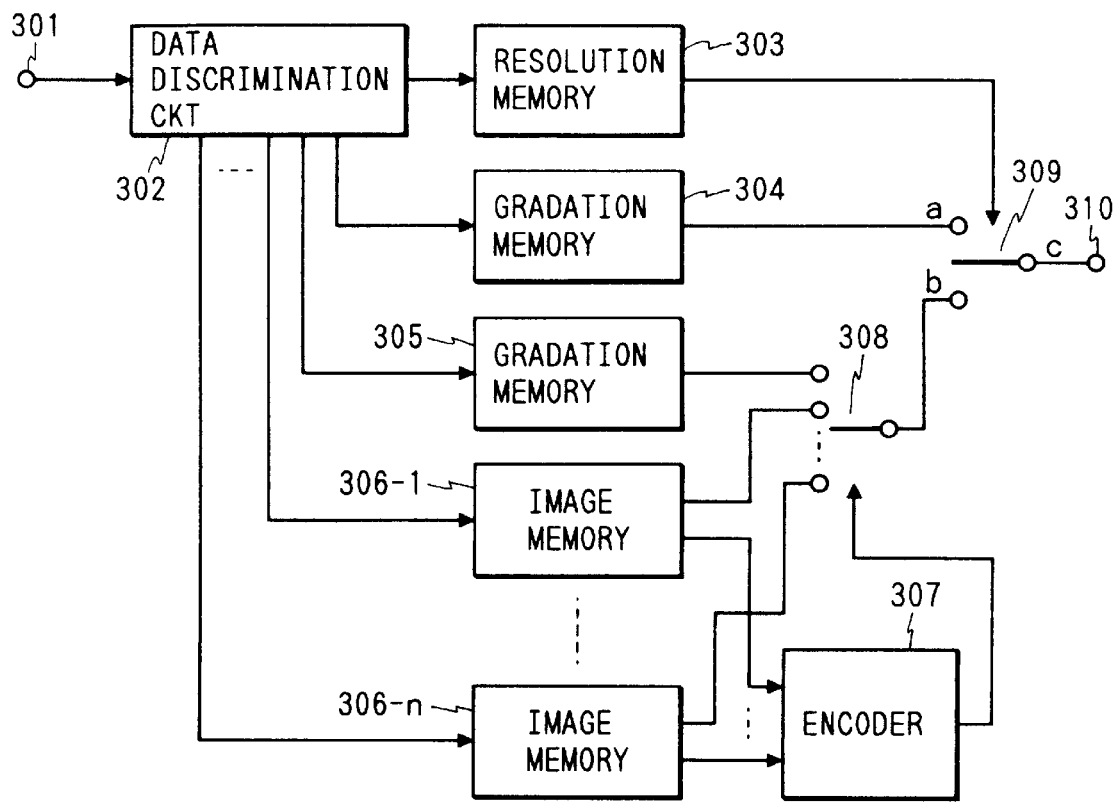
FIG. 18 is a block diagram which illustrates an eighth embodiment of the image processing apparatus according to the present invention.

FIG. 18 is a block diagram which illustrates the structure of an eighth embodiment of the image processing apparatus according to the present invention. Referring to FIG. 18, reference numeral 301 represents an input terminal, 302 represents a data discriminating circuit, 303 represents a resolution memory, 304 and 305 represent gradation memories, 306 represents an image memory, 307 represents a priority encoder, 308 and 309 represent selectors and 310 represents an output terminal.

The host computer is connected to the input terminal 301 so that data to be stored is supplied from the host computer to the resolution memory 303, the gradation memories 304 and 305 and the image memory 306. The data discriminating circuit 302 interprets command information added to the stored data before data is stored in the corresponding memories 303, 304, 305 and 306. Data for one page is transferred from the host computer so that the operation of the printer engine is commenced. In response to the synchronous signal (HSYNC) of the commencement, each of the memories 303, 304, 305 and 306 transmits data starting from the leading pixel of the page in synchronization with the printer engine. As a result, data is supplied to the control terminal, the input terminal a of each of the selectors 309 and each input terminal of the selector 307.

On the other hand, an image area signal denoting the valid/invalid of data transmitted from each of the image memories is supplied from the image memory 306 to the priority encoder 307. The priority encoder 307 controls the selector 308 in response to the supplied image area signal so as to cause the significant image data set finally to be selected. In a case where all of the image data items are invalid, the background color data in the gradation memory 305 is selected. Therefore, image data for the finally set area is supplied to the terminal b of the selector 309 in a case where the significant image data is present. Background color data is supplied to the same in a case where no significant image data is present. The selector 309 selects data (that is, data in the gradation memory 304) at the terminal a as the drawing color when the resolution data is "1", while the same selects data at the terminal b as the background color when the resolution data is "0". As a result, the gradation data is supplied to the printer engine connected to the output terminal 307.

Figure 19:
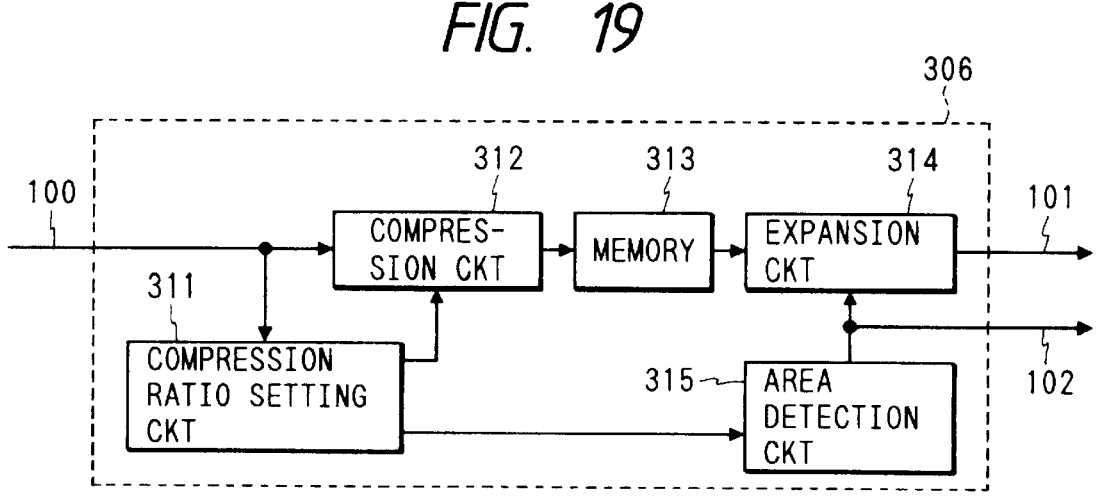
FIG. 19 is an example of the schematic structure of the image memory.

FIG. 19 is a block diagram which illustrates the schematic structure of the image memory 306.

Referring to FIG. 19, reference numeral 311 represents a compression ratio setting circuit, 312 represents a compression circuit, 313 represents a memory, 314 represents an expansion circuit and 315 represents an area detection circuit.

When the leading coordinate, the width and the height of the image area is supplied through the signal line 100 to the compression ratio setting circuit 311, the compression ratio setting circuit 311 calculate the quantity of supplied image data from the size of the above-described area, that is, the width and the height so as to set the compression ratio from the ratio of the capacity of the memory 313. In a case where the compression ratio is 1/k or less, the image area is sectioned so as to raise it to 1/k or more. On the other hand, the coordinate values of the two point of the final coordinate of the area obtained from the above-described leading coordinate and the width and the height of the area is set to each of the registers of the area detection circuit 315. The compression circuit 312 controls the quantizing condition or the like so as to realize the compression ratio set by the compression ratio setting circuit 311 so that compressed image data is stored in the memory 313. The compression circuit 312 is a known compression encoding circuit of a perpendicular-conversion or vector quantizing type. Since the block diagram which illustrates the schematic structure of the compression circuit 312 is the same as FIG. 8, its description is omitted here.

The block structural view of the predictive encoding circuit 20 is the same as FIG. 9.

The block diagram which illustrates the schematic structure of the gradation memories 304 and 305 is the same as FIG. 11.

The block diagram which illustrates the schematic structure of the area judging circuit 311 is shown.

According to this embodiment, the significant area of each of the gradation registers 230-2 to 230-n is limited to a rectangle as shown in FIG. 13, the significant area being defined by a point $(x_0, y_0)$ (the upper left corner of the rectangle shown in FIG. 8 to be hereinafter called "start point") which is first scanned and a point $(x_1, y_1)$ (the lower right corner of the rectangle shown in FIG. 8 to be hereinafter called "end point") which is scanned finally. Referring to FIG. 13, the x-axial direction is arranged to be the main scanning direction, while the y-axial direction is arranged to be the sub-scanning direction. The coordinate values $(x_0, y_0)$ and $(x_1, y_1)$ of the above-described start and end points discriminated by the data discriminating circuit 2 are stored in each of registers 35, 36, 37 and 38 of the area judging circuit 232 which corresponds to the gradation register 230 shown in FIG. 11.

On the other hand, at the time of printing out data, the coordinate value of pixel data which has been read out from the resolution memory 303 is received through the signal lines 105 and 106. The first comparison circuit 239-2 makes a comparison between x-coordinate value x of the above-described resolution memory 303 and x-coordinate values $x_0$ and $x_1$ of the start and end points. If $x_0 \leq x \leq x_1$, "1" supplied to the AND circuit 41, while, when $x<x_0$ or $x>x_1$, "0" is supplied to the same. Similarly, the second comparison circuit 43 supplies "1" if $y_0 \leq y \leq y_1$ to the AND circuit 44, while the same supplies "0" if $y<y_0$ or $y>y_1$. Therefore, "1" is transmitted from the AND circuit 44 in a case (i) where $x_0 \leq x \leq x_1$ and as well as $y_0 \leq y \leq y_1$. In the case (ii) except for (i), "0" is transmitted. As a result, the area detection can be performed. The result of the detection performed by each of the area detection circuits 233-2 to 233-n is subjected to a process in which the number of the area of the detection areas which is finally set is encoded by the priority encoder 234 for the purpose of judging the priority of the superposed portion designated by a diagonal portion shown in FIG. 13 so as to be transmitted through a signal line 107. That is, the area in the superposed portion set respectively latter is judged to be significant. In a case where all of the results of the discrimination operations of the areas are "0", the priority encoder 234 transmits "0" so as to cause the selector 231 to select the gradation data (that is, the default value) in the gradation register 230-1 shown in FIG. 11.

The image area detection circuit 315 shown in FIG. 19 is constituted similarly to the area detection circuit 233 sown in FIG. 12.

FIG. 18 which illustrates the overall structure of the image processing apparatus including the image storage portion is the same as FIG. 1B.

As described above, this embodiment comprises an image memory for compressing and storing continuous gradation data such as image data by utilizing the correlation between pixels and visual characteristics, a gradation memory for storing the text color (drawing color) or the background color for each specific area and a resolution memory for storing the dot resolution of pixel data. The output data from the above-described image memory and that from the gradation memory is switched over in response to the output signal from the resolution memory. As a result, the memory capacity can be reduced while maintaining both of the image quality of the text and that of the image.

Furthermore, a plurality of image memories are provided so as to enable the image data to be synthesized. Therefore, the efficiency of transferring image data from the host computer is improved so that the time taken to complete the data transfer can be shortened.

[Embodiment 9]

Figure 20:
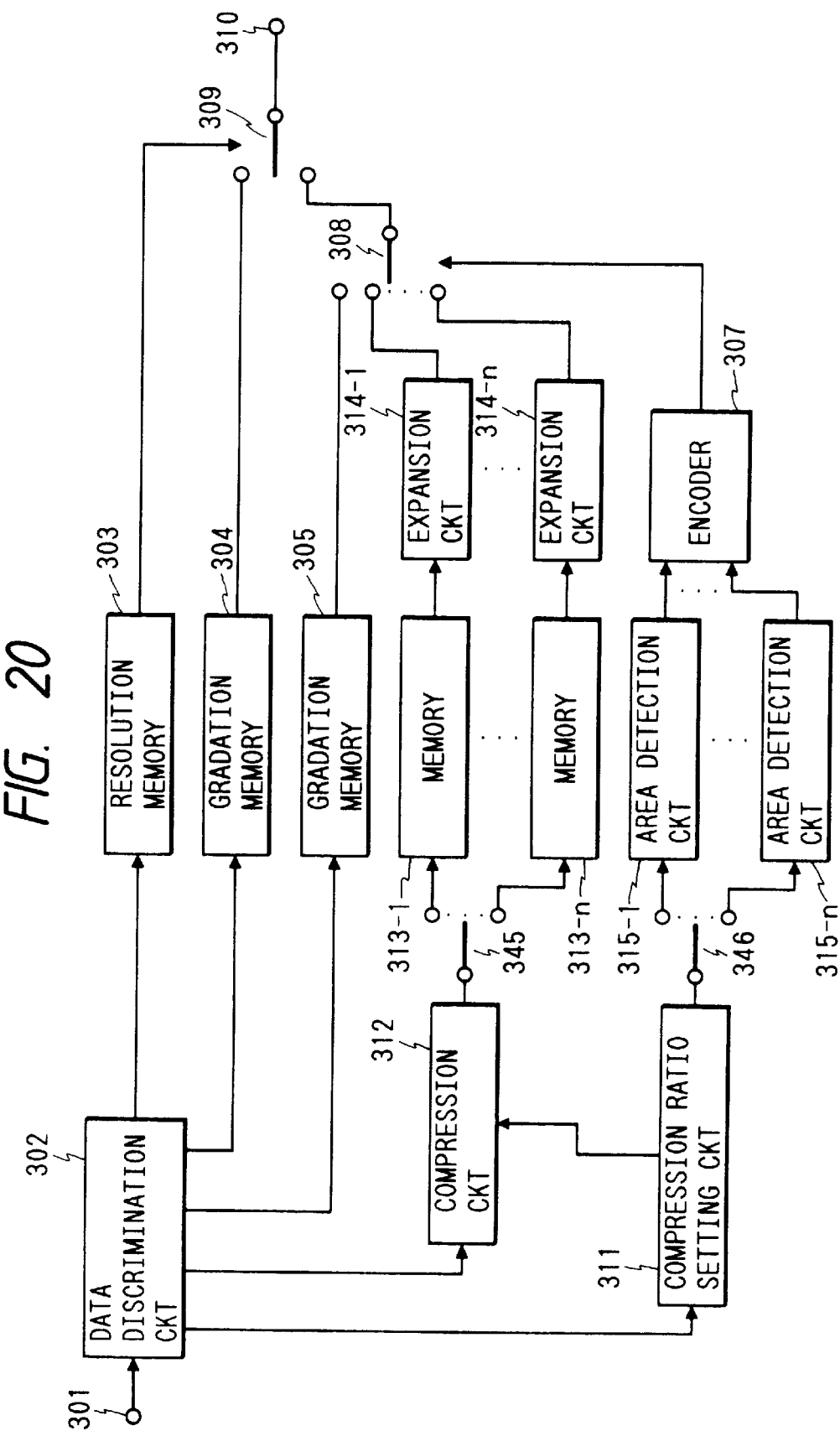
FIG. 20 is a block diagram which illustrates the structure of a ninth embodiment of the present invention.

FIG. 20 is a block diagram which illustrates a ninth embodiment of the image processing apparatus according to the present invention. Referring to FIG. 20, the elements having the same functions as those shown in FIGS. 18 and 19 are given the same reference numerals. Therefore, the description will be made about only the difference from the eighth embodiment.

Referring to FIG. 20, reference numerals 345 and 346 represent selectors.

Since image data is transferred from the host computer for each image area, the compression circuit 312 can be commonly used by each image memory. On the other hand, since the image areas are permitted to be superposed according to this embodiment, the expansion circuit 314 cannot be commonly used (however, the common use of it is not permitted in a case where there is no superposing).

Image data discriminated by the data discriminating circuit 302 is subjected to the command information interpretation process in the compression ratio setting circuit so that the compression ratio and the coordinates of the starting point and the end point are calculated so as to be supplied to the compression circuit 312 and the selector 346. The compression circuit 312 compresses the image data in accordance with the set compression ratio so as to be sequentially stored for each image area starting from the memory 313-1. Similarly, the coordinate of the starting point and the end point of each of the image regions are stored to the registers starting from the area detection circuit 315-1 via the selector 346. Since the ensuing process is the same as that performed according to the eighth embodiment, its description is omitted here.

By commonly using the compression circuit 312 and the compression ratio setting circuit 311 for each of the image memories, the quantity of the hardware can be reduced.

[Embodiment 10]

Figure 21:
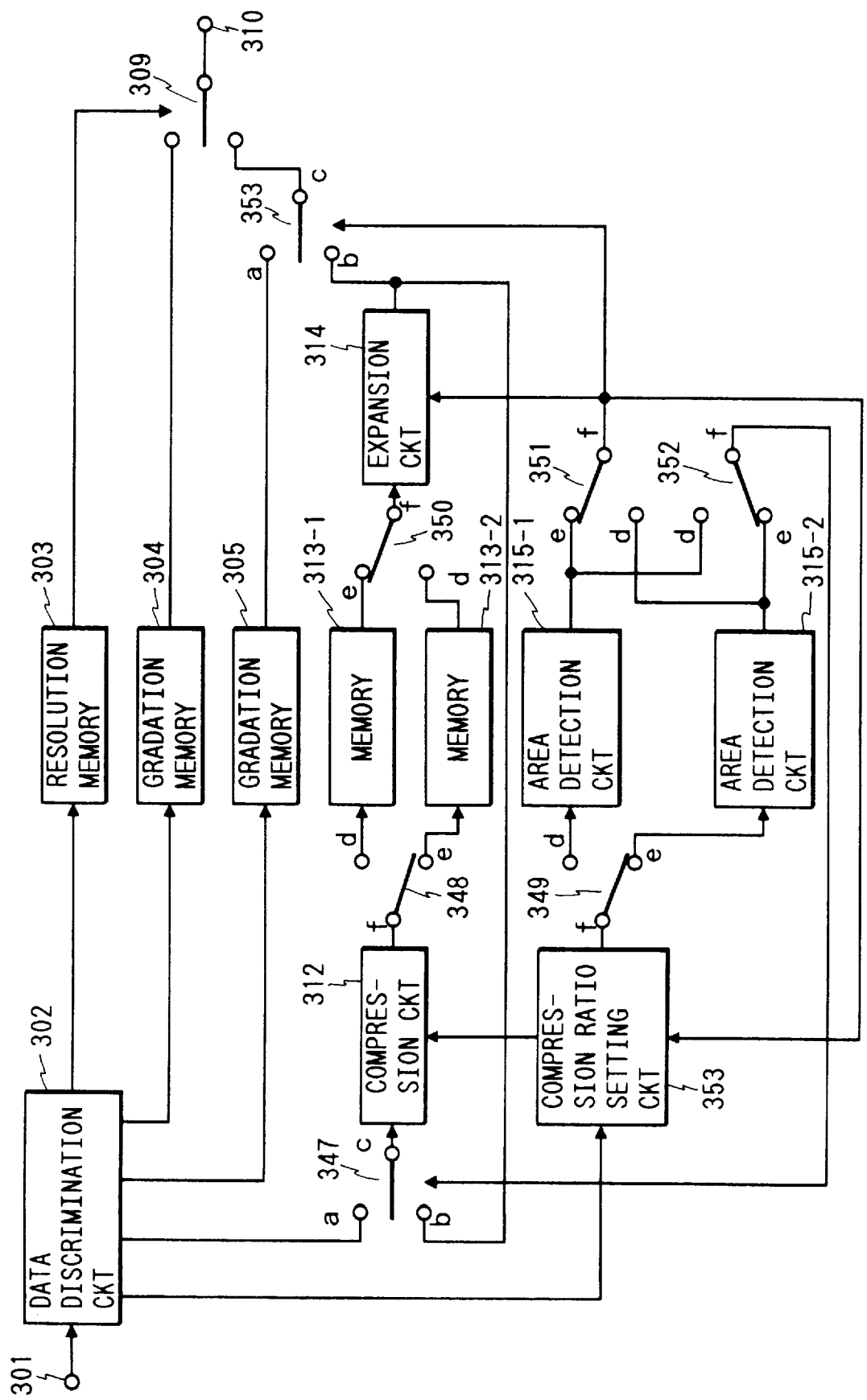
FIG. 21 is a block diagram which illustrates the structure of a tenth embodiment of the present invention.

FIG. 21 is a block diagram which illustrates a tenth embodiment of the image processing apparatus according to the present invention. Referring to FIG. 21, the elements having the same functions as those shown in FIGS. 18 and 19 are given the same reference numerals. Therefore, only the difference from the eighth embodiment will now be described.

Referring to FIG. 21, reference numerals 347, 348, 349, 350, 351 and 352 represent selectors and 353 represents a compression ratio setting circuit.

According to this embodiment, whenever image data is transferred from the host computer, compressed data stored in the memory is expanded so as to be synthesized with the supplied image data before compressed to be stored in another memory. According to this structure, the compression circuit 312, the expansion circuit 313 and the compression ratio setting circuit 353 can be respectively reduced to one system, while the memory 313 and the image area detection circuit 313 can be respectively reduced to two systems. Therefor, the quantity of the hardware can be significantly reduced.

Then, a method of synthesizing image data will now be described.

In the initial stage, the selector 347 selects the terminal a, while the selectors 348 to 352 respectively select the terminal d. Therefore, first image-area data is compressed so as to be stored in the memory 313-1, while the coordinates of the start point and the end point of the image area are stored in the area detection circuit 315-1. When the first image-area data has been stored, the selectors 348 to 352 are controlled to select the terminal e.

When second image-area data is supplied from the data discriminating circuit 302, the compression ratio setting circuit 353 calculates the coordinate $(x_0, y_0)$ of the start point and the coordinate $(x_1, y_1)$ of the end point of the second image area from coordinate $(x_s, y_s)$ of the start point, the coordinate $(x_e, y_e)$ of the end point of the area detection circuit 315-1 supplied from the selector 351 and the header information supplied from the data discriminating circuit 302. From the coordinate $(x_0, y_0)$ of the start point and the coordinate $(x_1, y_1)$ of the end point of the second image area, the coordinate $(x'_s, y'_s)$ of the start point and the coordinate $(x'_e, y'_e)$ of the end point of the synthesized area are calculated by the following calculations so as to store them in the area detection circuit 315-2:

$\{x'_s=\min (x_0, x_s)\} \{x'_e=\max (x_1, x_e)\}$
$\{y'_s=\min (y_0, y_s)\} \{y'_e=\max (y_1, y_e)\}$ Then, the target compression ratio is calculated from the coordinates of the start and the end points of the synthetic area so as to set it in the compression circuit 312. As a result, the selector 347 synthesizes from the pixel at the coordinate of the start point to the pixel at the coordinate of the end point. Since the second image area detection signal selected by the selector 352 is supplied to the control terminal of the selector 347, the selector 347 selects the terminal a (that is, the second image data) when the synthetic pixel is in the second image area. In the other cases, it selects the terminal b (that is, the output image data from the expanding circuit 314) so as to synthesize as described above. The synthesized image data is compressed by the compression circuit 312 so as to be stored in the memory 313-2 via the selector 348. The expansion circuit 314 transmits an expanded image data when the area detection signal supplied from the selector 351 is valid, while the same transmits empty (white) data when it is invalid. The end coordinate in the synthetic area is subjected to the synthetic process by the above-described process. When the compressed data has been stored in the memory 313-2, the selector 348 to 352 are reversed so as to select the terminal d. Thus, a state of waiting for the synthesizing process of the image area is realized.

By repeating the above-described operations, image data for one page is stored in the memory 313 so that the operation of the printer engine is commenced. As a result, the compressed image finally stored is supplied to the expanding circuit 314. Therefore, image data, which is in synchronization with the printer engine, is supplied to the terminal b of the selector 353. Since the ensuing process is the same as that according to the eighth embodiment, its description is omitted here.

According to the eighth to the tenth embodiments, gradation information (drawing color) the text data is stored in the gradation memory 304. Another structure may be employed in which the same is stored in the image memory. In this case, the background color is stored in the gradation memory 304, causing the necessity of using the gradation memory 305 to be eliminated.

As described above, the image storage apparatus according to the present invention, an image which is a mixture with the text image can be stored while maintaining excellent image quality of both of the text and the image by necessitating a reduced memory capacity.

Furthermore, since the image data can be synthesized, the time necessary to complete the transference of the image data can be shortened. Furthermore, a variety of images can be output easily.

[Embodiment 11]

A preferred embodiment of the present invention will now be described with reference to the drawings.

FIG. 22 is a schematic block diagram which the structure of an embodiment of the image processing apparatus according to the present invention. Referring to FIG. 22, image data described in page description language (PDL), for example, postscript (PS) developed by Adobe or CaPSL developed by Canon is received through the input terminal 401. The PDL pixel data thus-supplied is converted into raster image data by the interpreter 402. Simultaneously, the image data is subjected to a discrimination that the image data is the line picture such as the character or the graphs or the half-tone image such as the photograph. A discrimination signal which denotes the result of the discrimination is transmitted to the signal switch 407 and the index memory 410.

The raster image data converted by the interpreter 402 is sectioned into blocks composed of 8×8 pixels by the block formation circuit 403. The thus-created block is subjected to a discrete cosine transformation by the discrete cosine transformation (DCT) circuit 404. The transformation coefficient is supplied to the quantizer (Q) 405.

Then, the signal switch 407 connects the terminal a (or b) of the corresponding Q-table 406 to the common terminal c in response to the discriminating signal supplied from the interpreter 402. As a result of the above-described connection, the quantizer 405 performs a line-quantization of the transformation coefficient in accordance with quantizing step information supplied from the character table 406a or the table 406 of the tables of the image table 406b.

The transformation coefficient, which has been linear-quantized, is variable-length-encoded by the next variable-length-encoding circuit (VLC) 408 so that data for one block is stored in the frame memory 409. At this time, the above-described discrimination signal (index) is stored in the index memory 410.

According to this embodiment, since the two types of Q-tables 406a and 406b are provided, the index is 1 bit for each block.

By repeating the above-described operation, data for one frame is registered in the frame memory 409.

The structure of the variable-length-encoding circuit 408 is the same as that of 442 to 452 shown in FIG. 25. However, another variable-length-encoding circuit (for example, an arithmetic encoding circuit) may be employed.

FIGS. 23A and 23B respectively illustrate the character tables 406a and 406b.

As can be clearly seen from the drawings, the character table (23A) stores step information with which the resolution can be improved, while the character table (23B) stores that with which the gradation can be improved.

[Embodiment 12]

A twelfth embodiment of the present invention will now be described with reference to the drawings.

FIG. 24 is a schematic block diagram which illustrates the image processing apparatus according to this embodiment.

The blocks having the same functions as those shown in FIG. 22 are given the same reference numerals. Therefore, their descriptions are omitted here.

As shown in FIG. 24, the discriminating means for discriminating whether or not the subject data is character data or image data comprises an ordinary image area separation (the edge detection circuit 433) means.

Referring to FIG. 24, when bit map image data has been received through the input terminal 431, it is sectioned into blocks composed of, for example, 8×8 pixels by the ensuing block formation circuit so as to be supplied to the edge detection circuit 434. The edge detection circuit 434 connects the common terminal c of the signal switch 407 to the terminal a adjacent to the character table 406a of the Q-table 406 in a case where the difference between the maximum value and the minimum value for each block or the maximum value of the difference from the adjacent pixel is larger than predetermined value k. In a case where the difference between the maximum value and the minimum value and the maximum value of the difference from the adjacent pixel is less than the predetermined value k, the edge detection circuit 434 connects the common terminal of the signal switch 407 to the terminal b adjacent to the image table 406b of the Q-table 406.

On the other hand, the image data which has passed through the edge detection circuit 434 is subjected to the cosine transformation by the discrete cosine transformation (DCT) circuit 404 so that the transformation coefficient is subjected to the linear-quantization process in accordance with quantizing step information supplied from the character table 406 which is either the character table 406a or the image table 406b.

Similarly to the above-described embodiments, the transformation coefficient, which has been linear-quantized, is variable-length-encoded by the variable-length-encoding circuit (VLC) 408 so that data for one block is stored in the frame memory 409. Similarly, the index is stored in the index memory 410. Also according to this embodiment, since the two types of Q-tables are provided, the index is 1 bit for each block.

By repeating the above-described operation, data for one frame is registered in the frame memory 409. The character table 406a and the image table 406b are structured as shown in FIGS. 23A and 23B similarly to the above-described embodiments. As a result, the character table 23A stores step information with which the resolution can be improved, while the image table 23B stores step information with which the gradation can be improved.

According to the above-described two embodiments, the coefficient of each of the character table and the image table comprises as shown in FIG. 23 (23A and 23B). The present invention is not limited to this. They can be further divided into small blocks or the most suitable coefficient to the characteristics of the output apparatus can be employed.

In addition, the present invention is not limited to the structure in which one character table and the image tale are used. Therefore, another structure may be employed in which a plurality of the character tables and the image tables are used to suit the ratio of character data/image data and the size of the edge. Another structure may be employed to obtain the similar effect in which the edge detection circuit is disposed at the rear of the DCT circuit 404 so as to detect the edge on the frequency space.

The above-described table may comprise a ROM or a RAM or the like. In a case where the table comprises the RAM, the quantizing characteristics can be, by rewriting the quantizing parameter, changed while eliminating the necessity of changing the circuit.

According to the above-described embodiment, the reproducibility of both of the characters and the half-tone image such as the photograph can be improved so that the quality of the image can be improved. In the character portion, the resolution can be improved, while the gradation can be improved in the half-tone image portion.

As described above, according to the present invention, the reproducibility of each of the character image and the half-tone image can be improved so that the quality of the image can be improved.

[Embodiment 13]

A thirteenth embodiment of the present invention will now be described with reference to the drawings.

Recently, an apparatus capable of using a multi-value image or a color image has been disclosed. Usually, the image of this type is input through a scanner of a high resolution of a color scanner. Since the image data possesses a great capacity, it cannot be easily treated and a too long time takes to publish it. Therefore, a method has been employed in which the image data portion of the application software on the host computer side is placed in another file so as to be administered and operated (for example, "Open Prepress Interface" (hereinafter abbreviated to "OPI") of Post Script. Then, an example arranged by adapting the present invention to the above-described background will now be described.

Figure 27:
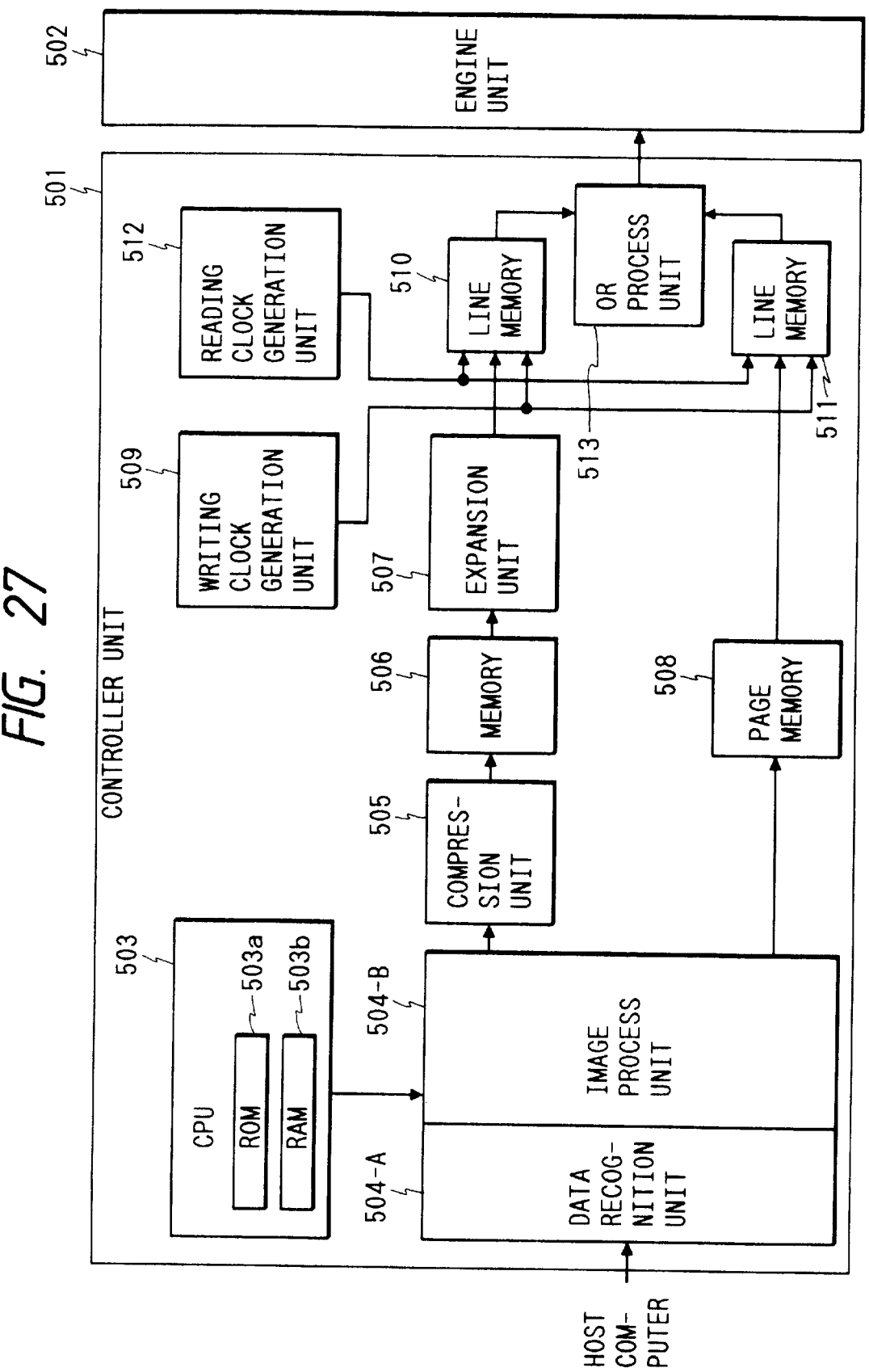
FIG. 27 is a detailed block diagram which illustrates an image recording apparatus according to the present invention.

FIG. 27 is a block diagram which illustrates the image recording apparatus according to this embodiment. According to this embodiment, the description is made about a laser beam printer.

Referring to FIG. 27, reference numeral 501 represents a controller unit of the laser beam printer and 502 represents an engine portion. Since the engine portion 502 is a type for reproducing the gradation by a known PWM process, the description about it is omitted here. Reference numeral 503 represents a CPU for controlling the overall operation of the apparatus, the CPU 503 comprising, therein, a ROM 503a storing the operational processing sequence (a flow chart shown in FIG. 28) and a RAM 503B to be sued as a work area. Reference numeral 504-A represents a data recognizing unit for recognizing whether or not the data supplied from the host computer is a multivalue data. According to this embodiment, a signal line for discriminating binary/multi-value data is provided in either of the two signal lines connected to the computer so as to discriminate it from the level of the signal line for discriminating binary/multi-value data. In a case where the host computer transmits a discrimination control command for enabling the discrimination of the binary/multi-value data to be performed, the exclusive signal line can, of course, be omitted from the structure. Therefore, the present invention is not limited to this. Reference numeral 504-B represents an image processing portion for generating an image output pattern, which corresponds to data supplied from the host computer, and develops it in the memory formed therein. Reference numeral 505 represents a compression unit for compressing/encoding image data in a case where the image data developed by the image processing unit 504-B is multi-value image data. Reference numeral 506 represents a memory for storing compressed/encoded data and 507 represents an expanding portion for expanding compressed/encoded data. Reference numeral 508 represents a page memory acting, in a case where the image data developed by the image processing unit 504-B is the binary image data such as the character and the line picture, to store the image data as it is (having a memory capacity for one page). Reference numeral 509 represents a clock generating unit for generating writing clock for causing the line memory 510 and 511 to store data for one line. Reference numeral 512 represents a reading clock generating portion for generating the reading clock so as to transmit data stored in the line memories 510 and 511 to the engine portion 502. Reference numeral 513 represents an OR processing unit for calculating the logical sum of the bit data for one line stored in the line memories 510 and 511 so as to transmit it to the engine unit 502. The line memory 510 stores multi-value image data of n bits for one pixel, while the line memory 511 stores the binary image of 1 it for 1 pixel. The OR processing unit 513 calculates the logical sum of the n-bit data read out from the line memory 510 and the 1-bit data read out from the line memory 511.

However, in corder to coincide the different numbers of bits, the 1-bit signal read out from the line memory 511 is converted into n-bit signal. That is, a conversion is performed in a case where the level of the 1-bit signal is "1", a signal the n bits of which are "1" is processed. On the contrary, in a case where the 1-bit signal is "0", a signal the n bits of which are "0" is processed. Then, the logical sum with the n-bit signal supplied from the line memory 510 is calculated.

The engine unit 502 D/A converts the n-bit signal transmitted from the OR processing unit 513 so as to make a comparison between an analog signal obtained from the D/A conversion and a triangular wave. As a result, the engine unit 502 generates a signal PWM which has been pulse-width modulated. Then, a semiconductor laser is driven in response to the above-described PWM signal so that a gradation image is formed. Since the image formation is performed in accordance with conventional electrophtographic technology, its description is omitted here.

Figure 28:
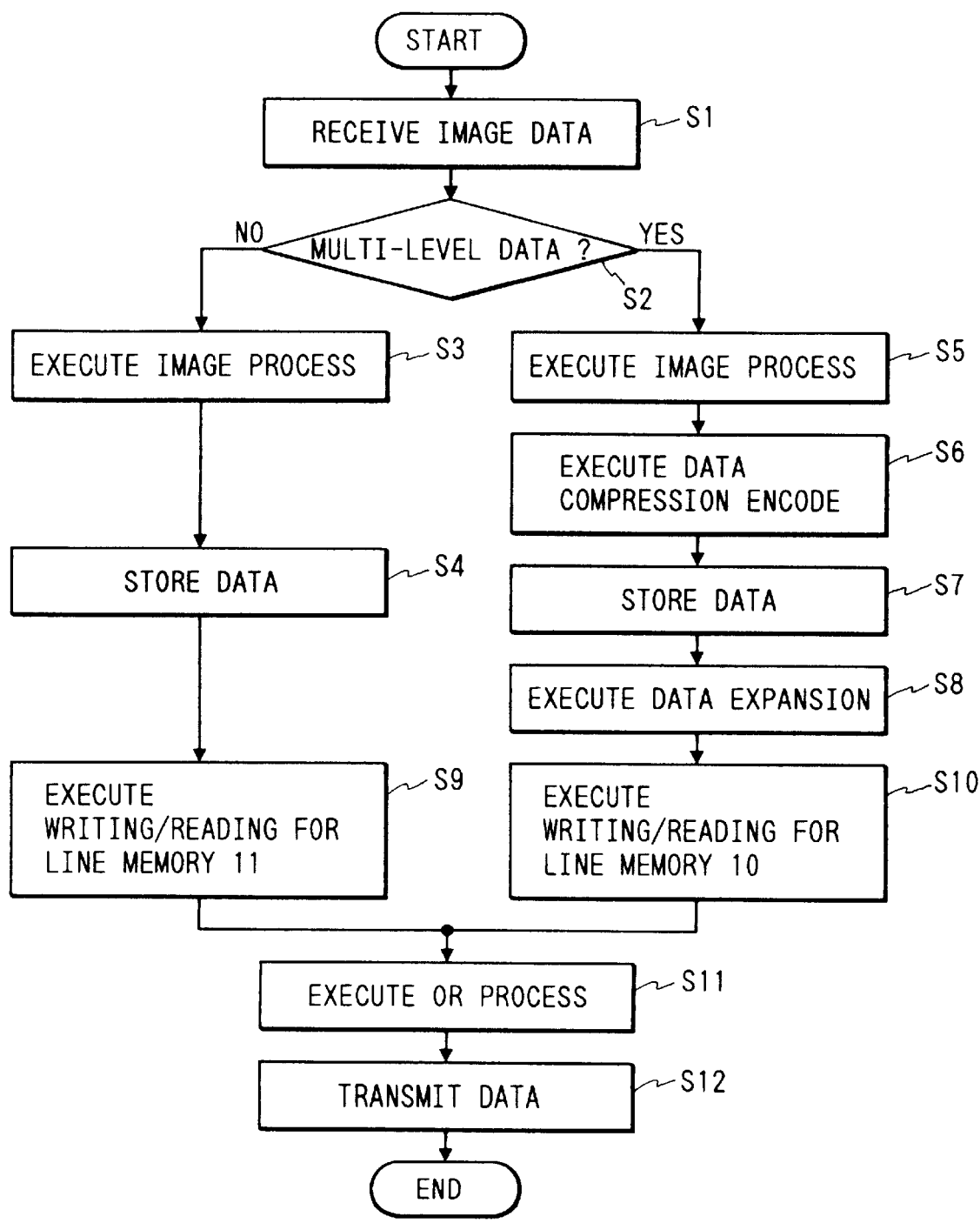
FIG. 28 is a flow chart which illustrates the operational sequential order in the image recording operation according to the present invention.

Then, the operation of the thus-constituted controller unit 1 according to this embodiment will now be described with reference to a flow chart shown in FIG. 28. The description will be made about a case in which a multi-value image in which data of 8 bit is possessed by one pixel.

First, in step S1, the image processing unit 504 in the controller portion 501 receives image data from the host computer. In step S2, it is determined whether or not the received data is multi-value data. In the OPI according to the postscript, by closing only the image portion of image data for one page as one file and by naming its head portion, it can be fetched into any image data. As for the body of the image data, the image data name fetched into the body is described to the data header portion and as well as the address denoting the position in the page at which the instructed image data is positioned is described in the data header portion.

If a discrimination has been made in step S2 that the subject data is not the multi-value image data, that is, it is the binary image such as the character and the line picture, the process proceeds to step S3. In step S3, it is developed to a pattern (bit pattern data) for transmitting an image before it is stored in the page memory 508 in next step S4. In step S9, data for one line is written or read out from the line memory 11 in synchronization with a clock generated from each of the writing clock generating unit 509 and reading clock generating portion 512.

If a description has been made in step S2 that the subject data is multi-value image data, the process proceeds to step S5 in which a pattern for a sequential image outputs is developed. Simultaneously, encoding is performed by using a known image compressing technology (step S6). Data compressed/encoded in step S6 is stored in the memory 506 in step S7. The encoded data stored in the memory 506 is expanded in the expanding unit 507 so that pattern data for each line and for transmitting image is generated successively (step S8). Data transmitted from the expanding unit 507 is written in the line memory 510 in synchronization with the writing clock generated from the writing clock generating unit. Data written to the line memory 510 is read out in synchronization with the reading clock generated from the reading clock generating unit 512 (step S10).

The OR processing unit 513 simultaneously reads data stored in the line memories 510 and 511 for one line in synchronization with the reading clock. Then, the OR processing unit 513 calculates the logical sum (OR) of the bit data for one line for both data items (step S11). The result of the calculation is sequentially transmitted to the engine unit (step S12).

As described above, according to the present invention, the page memory 508 may comprises a memory in which 1 bit is assigned to one pixel. Furthermore, the memory 506 stores the compressed image, causing the capacity to be reduced. That is, the multi-value image data is compressed, while the binary image data such as the character is not compressed. Therefore, an image of excellent image quality can be recorded while preventing deterioration by necessitating reduced memory capacity.

As described above, according to the present invention, an excellent binary image and multi-value image can be recorded while reducing the memory capacity.

Although the invention has been described in its preferred form with a certain degree of particularly, it is understood that the present disclosure of the preferred form has been changed in the details of construction and the combination and arrangement of parts may be resorted to without departing from the spirit and the scope of the invention as hereinafter claimed.

What is claimed is:

1. An image processing apparatus comprising:

receiving means for receiving data described in a page description language;

developing means for interpreting the data and converting the data into image data for each pixel;

discriminating means for discriminating whether the image data is line image data or half-tone image data;

first memory means for storing as real-image data the line image data discriminated by said discriminating means, the line image data being stored without compression;

compressing means for compressing the half-tone image data discriminated by said discriminating means by using an information-non-preserving type encoding method;

second memory means for storing as spatial-frequency image data the half-tone image data compressed by said compressing means;

decompressing means for decompressing compressed half-tone image data read out from said second memory means;

synthesizing means for synthesizing together line image data read out from said first memory means and the half-tone image data decompressed by said decompressing means; and output means for outputting the image data synthesized by said synthesizing means to an image formation unit.

2. An image processing apparatus according to claim 1, further comprising decompressing means for decompressing the compressed half-tone image data read out from said second memory means.

3. An image processing apparatus according to claim 2, further comprising synthesizing means for synthesizing the characteristic data read out from said first memory means and the half-tone image data output from said decompressing means.

4. An image processing apparatus according to claim 1, further comprising setting means for setting a color of the line image data.

5. An apparatus according to claim 1, wherein a read-out operation of the line image data from said first memory means and an output operation of the half-tone image data from said decompressing means are performed in synchronism with a sync signal input from said image formation unit.

6. An apparatus according to claim 1, wherein the synthesizing operation of said synthesizing means is performed in synchronism with a sync signal input from said image formation unit.

7. An apparatus according to claim 1, wherein said image formation unit is a page printer.

8. An image processing method comprising the steps of:

receiving data described in a page description language;

interpreting the data and converting the data into image data for each pixel;

discriminating whether the image data is line image data or half-tone image data;

storing as real-image data the discriminated line image data in a first memory means, the line image data being stored without compression;

compressing the discriminated half-tone image data by using an information-non-preserving type encoding method;

storing as spatial-frequency image data the compressed half-tone image data in a second memory means;

decompressing compressed half-tone image data read out of said second memory means;

synthesizing together line image data read out from the first memory means and the half-tone image data decompressed in said decompressing step; and outputting the image data synthesized in said synthesizing step to an image formation unit.

9. An image processing method according to claim 8, further comprising the step of decompressing the compressed half-tone image data read out from the second memory means.

10. An image processing method according to claim 9, further comprising the step of synthesizing the characteristic data read out from the first memory means and the decompressed half-tone image data.

11. An image processing method according to claim 8, further comprising the step of setting a color of the line image data.

12. A method according to claim 8, wherein a read-out operation of the line image data from the first memory means and an output operation of the half-tone image data in said decompressing step are performed in synchronism with a sync signal input from the image formation unit.

13. A method according to claim 8, wherein the synthesizing operation in said synthesizing step is performed in synchronism with a sync signal input from the image formation unit.

14. A method according to claim 8, wherein the image formation unit is a page printer.

* * * * *

UNITED STATES PATENT AND TRADEMARK OFFICE
CERTIFICATE OF CORRECTION

PATENT NO. : 5,774,634

DATED : June 30, 1998

INVENTOR(S) : KOICHI HONMA, et al.

Page 1 of 2

It is certified that error appears in the above-identified patent and that said Letters Patent is hereby corrected as shown below:

COLUMN 2

Line 42, "10" should be deleted.

COLUMN 4

Line 44, "be" should be deleted.

COLUMN 10

Line 38, "hose" should read --host--.
    Line 54, "the-image" should read --the image--.

COLUMN 11

Line 12, "is" should read --is a--.

COLUMN 15

Line 22, "colors-in" should read --colors in--.
    Line 36, "can" should read --can be--.

COLUMN 16

Line 8, "be," should read --b,--.
    Line 20, "and" (second occurrence) should be deleted.

UNITED STATES PATENT AND TRADEMARK OFFICE
CERTIFICATE OF CORRECTION

PATENT NO. : 5,774,634
DATED : June 30, 1998
INVENTOR(S): KOICHI HONMA, et al.

It is certified that error appears in the above-identified patent and that said Letters Patent is hereby corrected as shown below:

COLUMN 18

Line 10, "$x_0 \leq x \leq, x_1$" should read --$x_0 \leq x \leq, x_1,$--

COLUMN 23

Line 26, "sued" should read --used--

COLUMNS 25-26

Claims 2, 3, 9 and 10 should be deleted.

Signed and Sealed this

Fourth Day of May, 1999

Q. TODD DICKINSON

*Attest:*

*Attesting Officer*    *Acting Commissioner of Patents and Trademarks*